ated Oct. 25, 2021 issued by the European Intel-
United States Patent

Mochizuki et al.

(10) Patent No.: US 11,506,357 B2
(45) Date of Patent: Nov. 22, 2022

(54) VEHICLE HEAD LAMP

(71) Applicant: KOITO MANUFACTURING CO., LTD., Tokyo (JP)

(72) Inventors: Kiyotaka Mochizuki, Shizuoka (JP); Naoki Tatara, Shizuoka (JP); Norihiko Kobayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/280,347

(22) PCT Filed: Sep. 27, 2019

(86) PCT No.: PCT/JP2019/038345
§ 371 (c)(1),
(2) Date: Mar. 26, 2021

(87) PCT Pub. No.: WO2020/067497
PCT Pub. Date: Apr. 2, 2020

(65) Prior Publication Data
US 2022/0034469 A1  Feb. 3, 2022

(30) Foreign Application Priority Data

Sep. 28, 2018  (JP) .............................. JP2018-185203
Mar. 8, 2019  (JP) .............................. JP2019-042217

(51) Int. Cl.
*F21S 41/675*  (2018.01)
*F21S 41/64*  (2018.01)
(Continued)

(52) U.S. Cl.
CPC ........... *F21S 41/645* (2018.01); *F21S 41/143* (2018.01); *F21S 41/153* (2018.01); *F21S 41/39* (2018.01);
(Continued)

(58) Field of Classification Search
CPC .................... F21S 41/675; F21W 2102/00–40
See application file for complete search history.

(56) References Cited

U.S. PATENT DOCUMENTS

2004/0189447 A1  9/2004  Okubo et al.
2004/0218401 A1  11/2004  Okubo et al.
(Continued)

FOREIGN PATENT DOCUMENTS

EP  2 979 923 A1  2/2016
EP  3 287 319 A1  2/2018
(Continued)

OTHER PUBLICATIONS

Communication dated Oct. 25, 2021 issued by the European Intellectual Property Office in counterpart European Application No. 19867151.3.

(Continued)

*Primary Examiner* — Sean P Gramling
(74) *Attorney, Agent, or Firm* — Sughrue Mion, PLLC

(57) ABSTRACT

A vehicle head lamp includes a spatial light modulator and a control device. The vehicle head lamp forms a desired light distribution pattern by radiating light forward via the spatial light modulator, a high luminous intensity region and a low luminous intensity region adjacent to an outer edge of the high luminous intensity region are formed in the desired light distribution pattern to be irradiated by controlling the spatial light modulator, the low luminous intensity region is configured such that the luminous intensity decreases gradationally from the outer edge of the high luminous intensity region toward an outside of the low luminous intensity region, and the control device controls the spatial light modulator so as to relatively change at least one of sizes, luminous intensities, and positions of the high luminous (Continued)

intensity region and the low luminous intensity region based on a traveling condition of a vehicle.

20 Claims, 22 Drawing Sheets

(51) Int. Cl.
    *F21S 41/663* (2018.01)
    *F21S 41/143* (2018.01)
    *F21S 41/153* (2018.01)
    *F21S 41/39* (2018.01)
    *F21W 102/13* (2018.01)

(52) U.S. Cl.
    CPC ........... *F21S 41/663* (2018.01); *F21S 41/675* (2018.01); *F21W 2102/13* (2018.01)

(56) References Cited

U.S. PATENT DOCUMENTS

| | | | |
|---|---|---|---|
| 2013/0038736 A1* | 2/2013 | Yamamura | F21S 41/155 348/148 |
| 2015/0307018 A1 | 10/2015 | Shibata et al. | |
| 2016/0090025 A1 | 3/2016 | Nagasawa | |
| 2016/0185276 A1 | 6/2016 | Tanaka et al. | |
| 2017/0282786 A1 | 10/2017 | Toda et al. | |
| 2017/0334337 A1 | 11/2017 | Ohno | |
| 2020/0263850 A1 | 8/2020 | Kawaguchi et al. | |

FOREIGN PATENT DOCUMENTS

| | | |
|---|---|---|
| JP | 2004-210128 A | 7/2004 |
| JP | 2006-73305 A | 3/2006 |
| JP | 2006-273092 A | 10/2006 |
| JP | 2010-176981 A | 8/2010 |
| JP | 2011-157022 A | 8/2011 |
| JP | 2011-233305 A | 11/2011 |
| JP | 2014-7093 A | 1/2014 |
| JP | 2015-185476 A | 10/2015 |
| JP | 2016-68791 A | 5/2016 |
| JP | 2016-120871 A | 7/2016 |
| JP | 2017-206094 A | 11/2017 |
| WO | 2016/104319 A1 | 6/2016 |
| WO | 2017/104167 A1 | 6/2017 |
| WO | 2017/214648 A1 | 12/2017 |

OTHER PUBLICATIONS

International Search Report (PCT/ISA/210) dated Dec. 24, 2019, issued by the International Searching Authority in International Application No. PCT/JP2019/038345.

Written Opinion (PCT/ISA/237) dated Dec. 24, 2019, issued by the International Searching Authority in International Application No. PCT/JP2019/038345.

* cited by examiner

FIG. 15
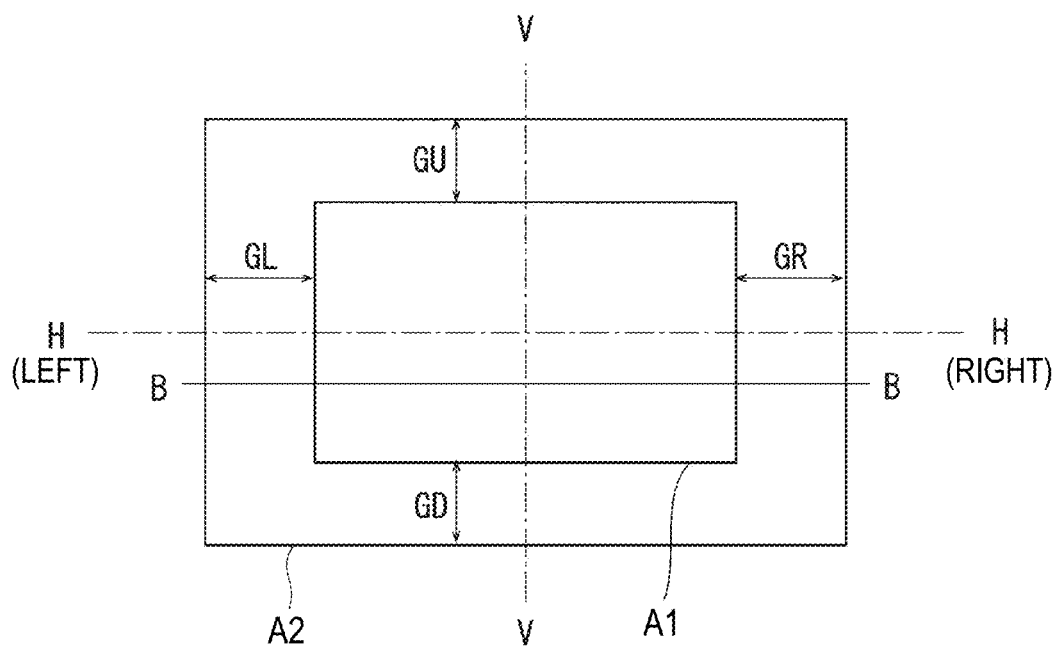
(A)
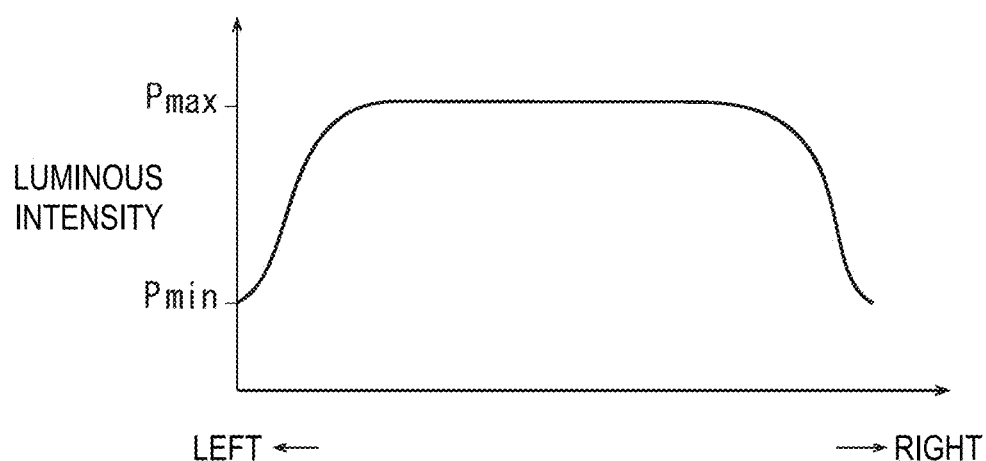
(B)

FIG. 16
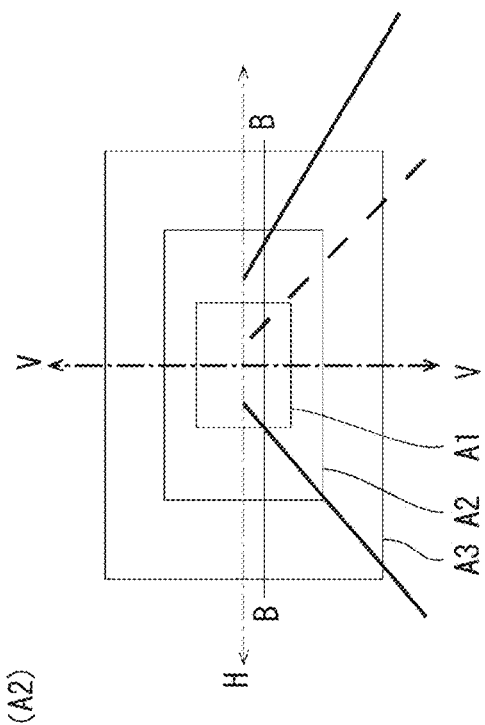
(A1)
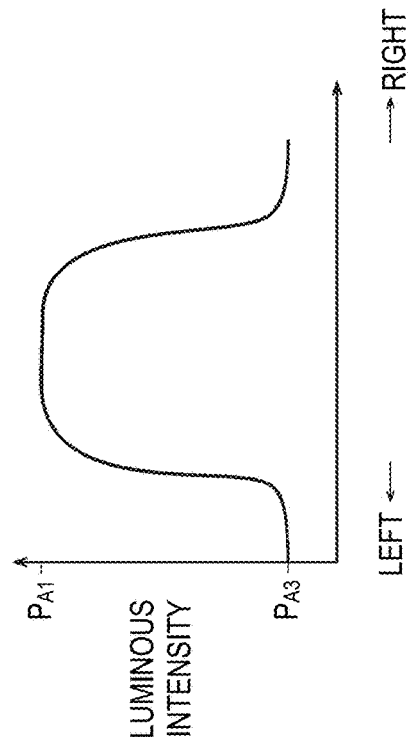
(A2)
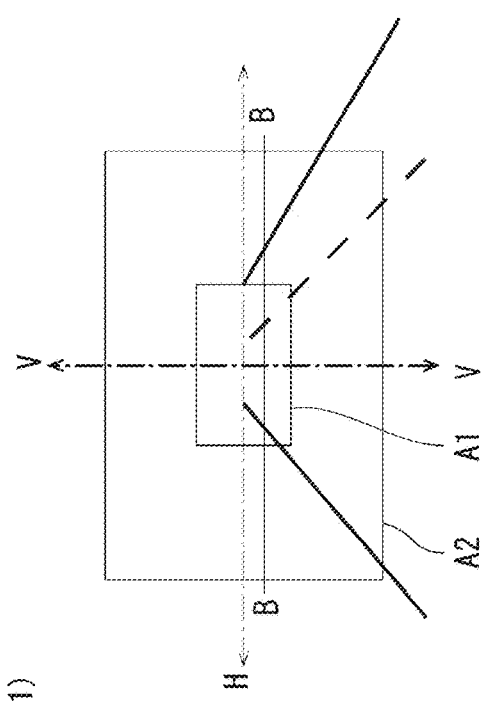
(B1)
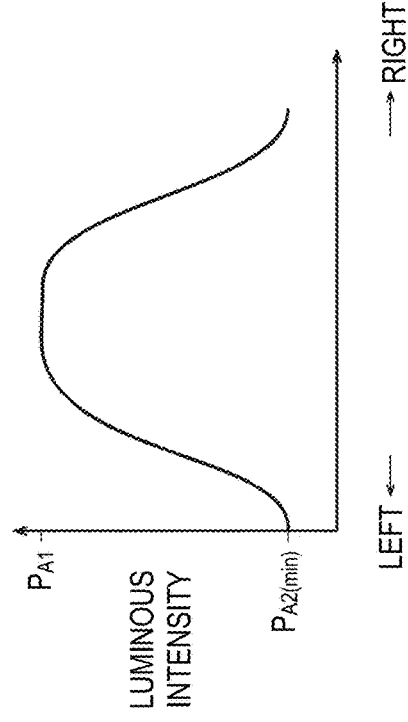
(B2)

FIG. 17
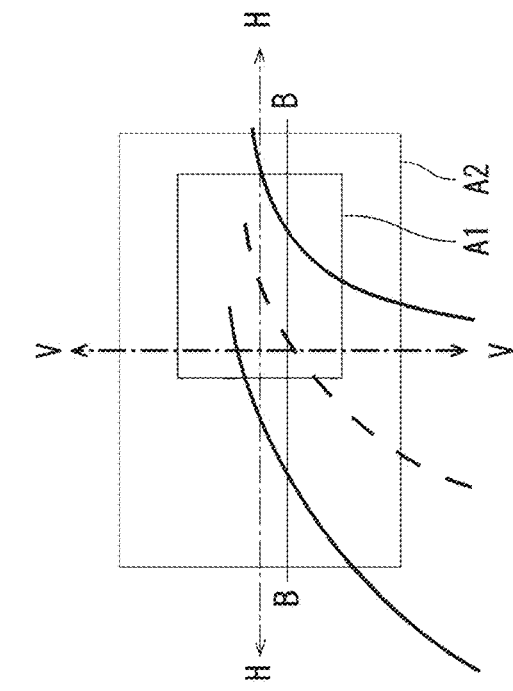
(A1)
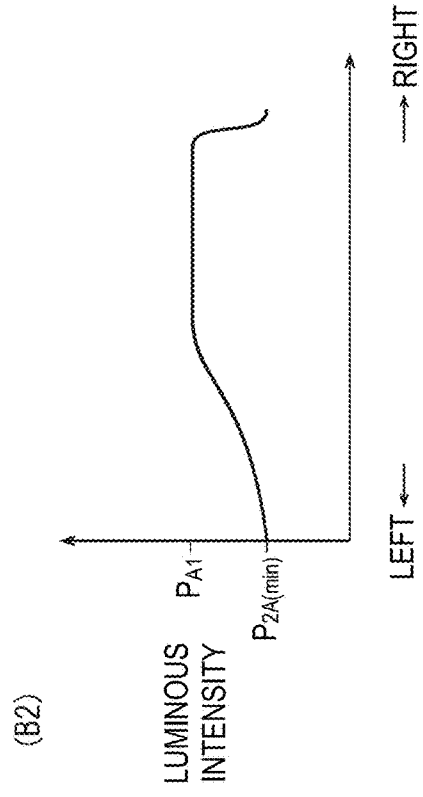
(B1)
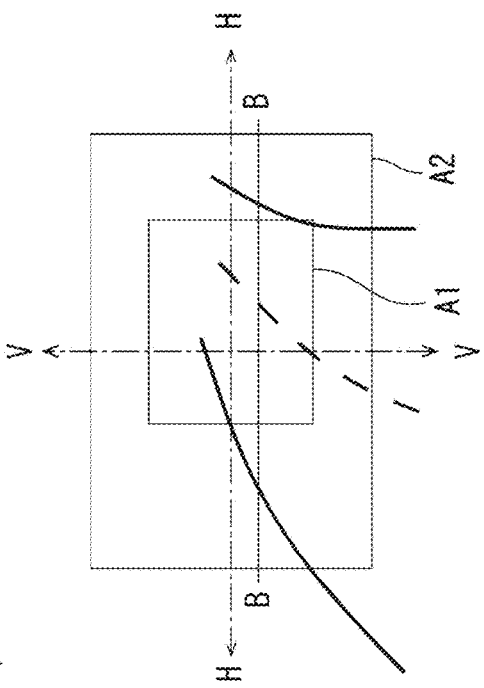
(A2)
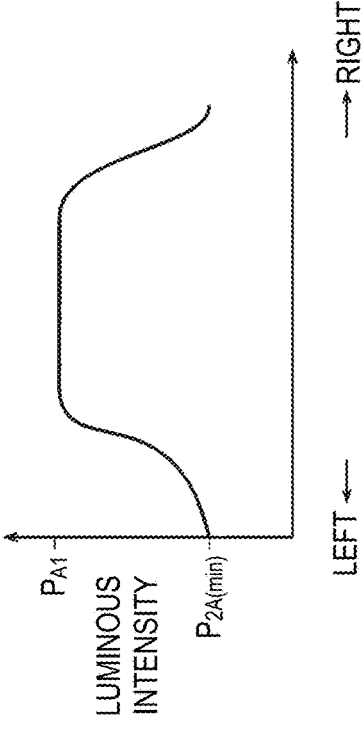
(B2)

FIG. 22
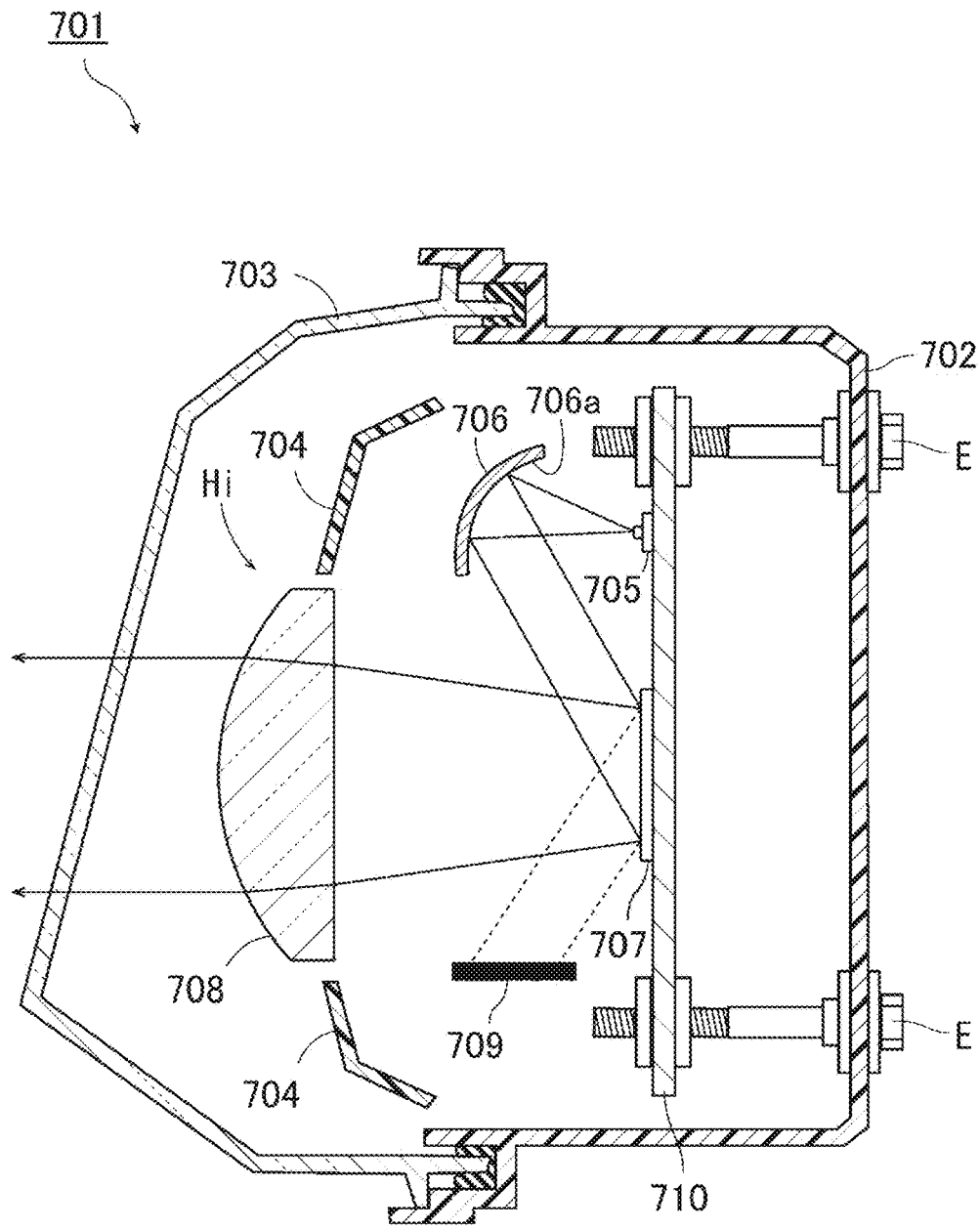
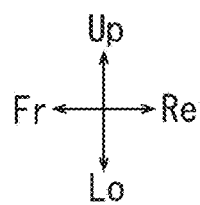

VEHICLE HEAD LAMP

CROSS-REFERENCE TO RELATED APPLICATIONS

This application is a National Phase Entry of PCT International Application No. PCT/JP2019/038345 filed on Sep. 27, 2019, which claims priority to Japanese Patent Application No. 2018-185203 filed on Sep. 28, 2018, and Japanese Patent Application No. 2019-042217 filed on Mar. 8, 2019, the contents of all of which are incorporated herein by reference in their entirety.

TECHNICAL FIELD

The present disclosure relates to a vehicle head lamp that is equipped on a vehicle and radiates light.

BACKGROUND ART

In the related art, in a predetermined light distribution pattern, a spot-like high luminous intensity region is formed in the light distribution pattern in order to improve visibility. For example, Patent Literature 1 discloses a vehicle head lamp that includes both a low luminance light source and a high luminance light source, and forms various light distribution patterns in accordance with a driving state of a vehicle while forming a spot-like high luminous intensity region in the light distribution pattern.

CITATION LIST

Patent Literature

Patent Literature 1: JP-A-2016-120871

SUMMARY OF INVENTION

Technical Problem

However, the spot-like high luminous intensity region makes a light and darkness boundary with a low luminous intensity region clear, or conversely brings difficulty in viewing to a driver.

The present disclosure proposes a vehicle lamp that reduces difficulty in viewing due to a light and darkness boundary while including a high luminous intensity region of a necessary part, and forms various light distribution patterns.

Solution to Problem

In order to achieve the above object, in an aspect of a vehicle head lamp according to a configuration of the present disclosure, the vehicle head lamp is configured to include a spatial light modulator having a light source and a control device that controls the spatial light modulator. In the vehicular head lamp forming a desired light distribution pattern by radiating light emitted from the light source forward via the spatial light modulator, a high luminous intensity region and a low luminous intensity region that is adjacent to an outer edge of the high luminous intensity region and has a luminous intensity lower than a luminous intensity of the high luminous intensity region are formed in a light distribution pattern desired to irradiate by control of the spatial light modulator by the control device, the low luminous intensity region is configured such that a luminous intensity gradationally decreases from the outer edge of the high luminous intensity region toward the outside of the low luminous intensity region, and the control device controls the spatial light modulator so as to relatively change at least one of sizes, luminous intensities, and positions of the high luminous intensity region and the low luminous intensity region in accordance with a traveling condition of a vehicle on which the control device is equipped. According to the aspect, it is possible to reduce difficulty in viewing due to the light and darkness boundary while including a high luminous intensity region of a necessary part, and to form various light distribution patterns.

In another aspect, the spatial light modulator is a scanning mechanism that has a mirror pivotable in two axial directions that reflects light emitted from the light source and performs scanning with the light from the light source reflected while pivoting the mirror, and the control device controls a timing of turning on and off the light source, luminance of the light source, a pivot direction of the mirror, a pivot range of the mirror, and a pivot speed of the mirror, whereby the scanning light from the scanning mechanism is overlapped to form a desired light distribution pattern.

In another aspect, when a predetermined region in a desired light distribution pattern is scanned with light reflected by the mirror, the control device controls a pivot speed of the mirror to be higher/lower than a pivot speed of the mirror outside the predetermined region in the desired light distribution pattern to form the low luminous intensity region/the high luminous intensity region.

In another aspect, when a predetermined region in a desired light distribution pattern is scanned with light reflected by the mirror, the control device controls luminance of the light source to be higher/lower than luminance of the light source outside the predetermined region in the desired light distribution pattern to form the low luminous intensity region/the high luminous intensity region.

In another aspect, the spatial light modulator is a rotation mechanism that rotates in one direction around a rotation axis while reflecting the light emitted from the light source and has a rotary reflector provided with a reflective surface that performs scanning with light of the light source reflected while rotating, and the control device controls a timing of turning on and off the light source, luminance of the light source, and a rotation speed of the rotary reflector, whereby a predetermined region is irradiated with reflected light from the rotary reflector to form a desired light distribution pattern.

In another aspect, when a predetermined region in a desired light distribution pattern is scanned with light reflected by the rotary reflector, the control device controls a rotation speed of the rotary reflector to be higher/lower than a rotation speed of the rotary reflector when the outside of the predetermined region in the desired light distribution pattern is scanned to form the low luminous intensity region/the high luminous intensity region.

In another aspect, when a predetermined region in a desired light distribution pattern is scanned with light reflected by the rotary reflector, the control device controls luminance of the light source to be higher/lower than luminance of the light source when the outside of the predetermined region in the desired light distribution pattern is scanned with the reflected light to form the low luminous intensity region/the high luminous intensity region.

In another aspect, the rotary reflector has a plurality of curved reflective surfaces configured such that a scanning speed of the reflected light is locally fast or slow, and the low luminous intensity region/the high luminous intensity region is formed by local dispersion/concentration of the reflected light.

In another aspect, the spatial light modulator is a light source unit in which a plurality of light sources that are individually and independently controllable are arranged in a matrix shape, and the control device individually controls turning on and off of the light source and luminance of the light source to form a desired light distribution pattern from irradiation light of the light source.

In another aspect, in the light source unit, a ratio of light sources to be actually turned on among the light sources present per unit area is set as a first lighting rate, and the control device controls the first lighting rate of a part corresponding to formation of a predetermined region in the desired light distribution pattern to be lower/higher than the first lighting rate of a part corresponding to the outside of the predetermined region in the desired light distribution pattern to form the low luminous intensity region/the high luminous intensity region.

In another aspect, the control device controls luminance of the light source corresponding to a predetermined region in a desired light distribution pattern to be higher/lower than luminance of the light source corresponding to the outside of the predetermined region in the desired light distribution pattern to form the low luminous intensity region/the high luminous intensity region.

In another aspect, the spatial light modulator is a transmissive liquid crystal device including the light source as a back light and a first liquid crystal layer, the first liquid crystal layer is gradationally switchable for each unit element between a first state in which light incident from the back light is transmitted and a second state in which a change in the light incident from the back light is not transmitted depending on a magnitude of an applied voltage given, and the control device controls the voltage applied to the first crystal layer for each unit element and controls transmittance of each unit element to form a desired light distribution pattern from light emitted from the back light and transmitted by the first liquid crystal layer.

In another aspect, the control device controls an applied voltage in a predetermined part of the first liquid crystal layer corresponding to a predetermined region in a desired light distribution pattern to be lower/higher than a voltage applied to a part of the first liquid crystal layer corresponding to the outside of the predetermined region in the desired light distribution pattern and increases/decreases transmittance of light incident from the back light to form the low luminous intensity region/the high luminous intensity region.

In another aspect, in the first liquid crystal layer, a ratio of unit elements that are in the first state in which light is transmitted among unit elements present per unit area is set as a second lighting rate, and the control device controls a second lighting rate in a predetermined part of the first liquid crystal layer corresponding to a predetermined region in a desired light distribution pattern to be lower/higher than a second lighting rate in a part of the first liquid crystal layer corresponding to the outside of the predetermined region in the desired light distribution pattern to form the low luminous intensity region/the high luminous intensity region.

In another aspect, the spatial light modulator is a transmissive liquid crystal device including the light source as a front light and a second liquid crystal layer, the second liquid crystal layer is a reflective liquid crystal device gradationally switchable for each unit element between a first state in which light incident from the front light is reflected and a second state in which a change in the light incident from the front light is not reflected depending on a magnitude of an applied voltage given, and the control device controls the voltage applied to the second crystal layer for each unit element and controls reflectance of the second liquid crystal layer for each unit element to form a desired light distribution pattern from light emitted from the front light and reflected by the second liquid crystal layer.

In another aspect, the control device controls an applied voltage in a predetermined part of the second liquid crystal layer corresponding to a predetermined region in a desired light distribution pattern to be lower/higher than a voltage applied to a part of the second liquid crystal layer corresponding to the outside of the predetermined region in the desired light distribution pattern and increases/decreases reflectance of light incident from the front light to form the low luminous intensity region/the high luminous intensity region.

In another aspect, in the second liquid crystal layer, a ratio of unit elements that are in the first state in which light is reflected among unit elements present per unit area is set as a third lighting rate, and the control device controls a third lighting rate in a predetermined part of the second liquid crystal layer corresponding to a predetermined region in a desired light distribution pattern to be lower/higher than a third lighting rate in a part of the second liquid crystal layer corresponding to the outside of the predetermined region in the desired light distribution pattern to form the low luminous intensity region/the high luminous intensity region.

In another aspect, the spatial light modulator is a light deflection mechanism having a light deflection device whose surface is provided with a plurality of reflective elements capable of selectively reflecting light incident individually by pivot, the light deflection mechanism is disposed so as to be capable of selectively reflecting the light emitted from the light source toward a front of the vehicle by the reflective element, and the control device individually controls a timing of turning on and off the light source and pivot of the reflective element to form a desired light distribution pattern.

In another aspect, in the light deflection mechanism, a ratio of the reflective elements selected to reflect light from a light source to the front of the vehicle among the reflective elements present per unit area is set as a light deflection rate, and the control device controls a light deflection rate of a part corresponding to formation of a predetermined region in a desired light distribution pattern to be higher/lower than a light deflection rate of a part corresponding to the outside of the predetermined region in the desired light distribution pattern to form the low luminous intensity region/the high luminous intensity region.

In another aspect, the reflective element is capable of switching selection/non-selection of reflection toward the front of the vehicle at high speed by pivot control, and the control device controls a time ratio at which reflection to the front of the vehicle is selected in the reflective element corresponding to a predetermined region in a desired light distribution pattern to be higher/lower than a time ratio in the reflective element corresponding to the outside of the predetermined region in the desired light distribution pattern to form the low luminous intensity region/the high luminous intensity region. With the configuration as described above, the luminous intensity and the luminous intensity gradient of the light distribution pattern are locally and gradationally adjustable, and the low luminous intensity region/the high luminous intensity region can be formed in a desired region in the light distribution pattern.

In another aspect, the control device performs control of increasing the high luminous intensity region when a traveling speed of the vehicle on which the control device is equipped exceeds a predetermined value. According to the aspect, viewability at the time of high speed driving is improved, and visibility depending on conditions is improved.

In another aspect, the control device performs control of increasing a luminous intensity of the high luminous intensity region when a traveling speed of the vehicle on which the control device is equipped exceeds a predetermined value. According to the aspect, a distant place is emphasized at the time of high speed driving, and visibility depending on conditions is improved.

In another aspect, when a traveling speed of the vehicle on which the control device is equipped exceeds a predetermined value, the control device performs control of reducing the low luminous intensity region and forming a second low luminous intensity region having a luminous intensity equal to or lower than a luminous intensity of a minimum luminous intensity region of the low luminous intensity region on an outer edge of the low luminous intensity region. According to the aspect, a traveling direction on a curved road becomes bright, and visibility is improved.

In another aspect, when the vehicle on which the control device is equipped goes toward a curved road, the control device performs control of increasing the low luminous intensity region formed in a direction horizontally opposite to a bending direction of the curved road. According to the aspect, a traveling direction on a curved road becomes bright, and visibility is improved.

In another aspect, when the vehicle on which the control device is equipped goes toward a curved road, the control device performs control of decreasing the low luminous intensity region formed in a direction horizontally the same as a bending direction of the curved road. According to the aspect, light and darkness emphasis on an end portion of the light distribution pattern is eliminated, and a sense of discomfort at the time of driving is improved.

In another aspect, the control device performs control of decreasing a luminous intensity of the high luminous intensity region depending on a steering angle of the vehicle on which the control device is equipped. According to the aspect, light and darkness emphasis on the end portion of the light distribution pattern occurring when the steering angle is large is alleviated, and a sense of discomfort of the driver on the curved road is improved.

In another aspect, the control device performs control of forming a third low luminous intensity region having a luminous intensity lower than a luminous intensity of the peripheral region in the light distribution pattern in accordance with conditions around the vehicle on which the control device is equipped. According to the aspect, glare can be prevented.

In another aspect, the control device performs control such that a luminous intensity of the third low luminous intensity region decreases from an outer edge of the third low luminous intensity region toward the inside of the third low luminous intensity region. According to the aspect, a sense of discomfort in visibility due to the light and darkness boundary is improved.

In another aspect, the control device performs control of adjusting a luminous intensity gradient of the third low luminous intensity region in accordance with conditions around the vehicle. According to the aspect, a target to be gazed at can be clearer, and higher attention of the driver can be called.

In another aspect, the control device performs control of forming a second high luminous intensity region having a luminous intensity higher than a luminous intensity of a peripheral region thereof in the light distribution pattern in accordance with conditions around the vehicle. According to the aspect, a target to be gazed at becomes clear, and driving safety is improved.

Advantageous Effects of Invention

As is clear from the above description, the present disclosure can propose a vehicle head lamp that reduces difficulty in viewing while including a high luminous intensity region of a necessary part, and forms various light distribution patterns.

Figure 13:
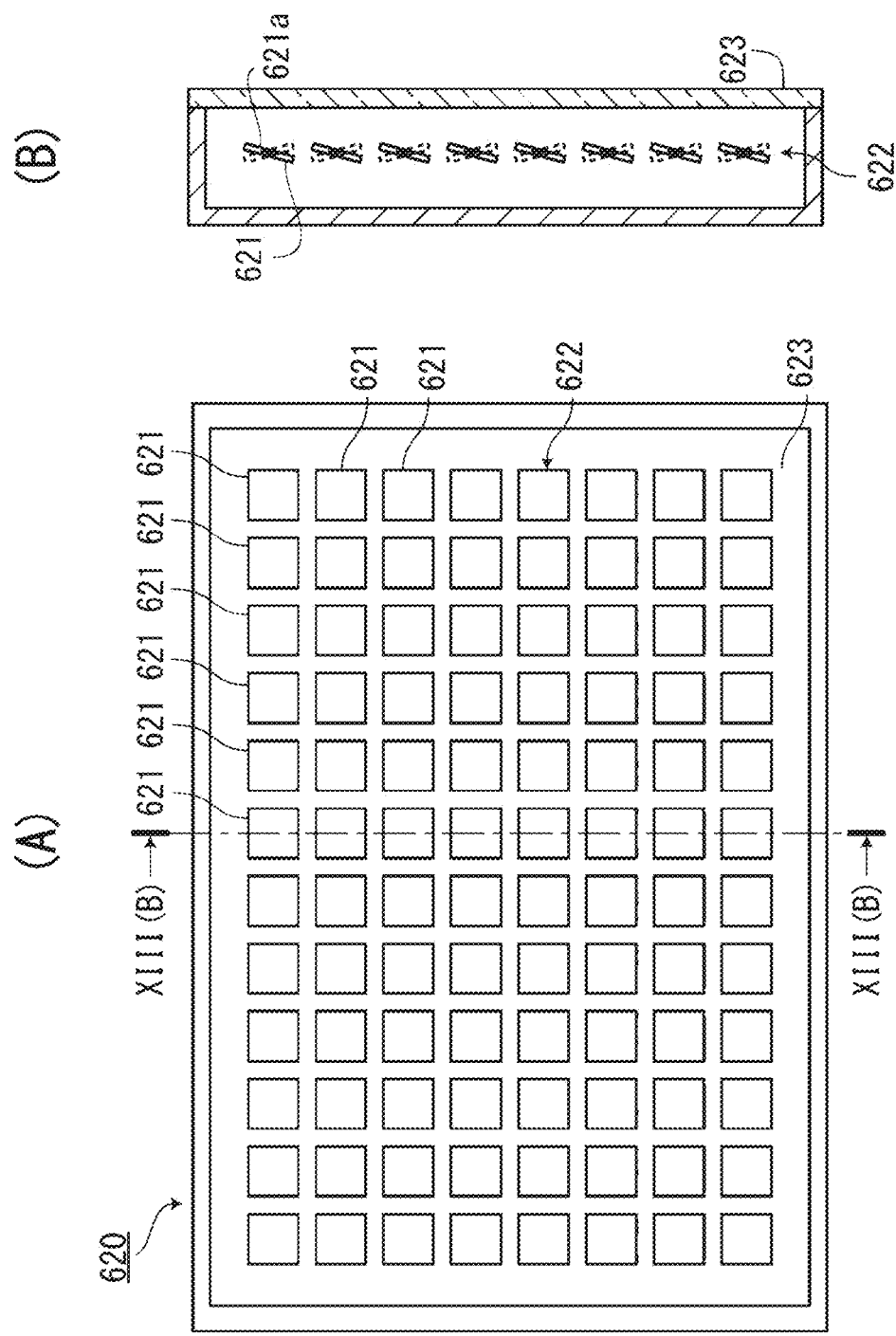

(A) of FIG. 13 is a front view of a light deflection device body. (B) of FIG. 13 is a cross-sectional view taken along a line XIII-XIII in (A) of FIG. 13.

Figure 14:
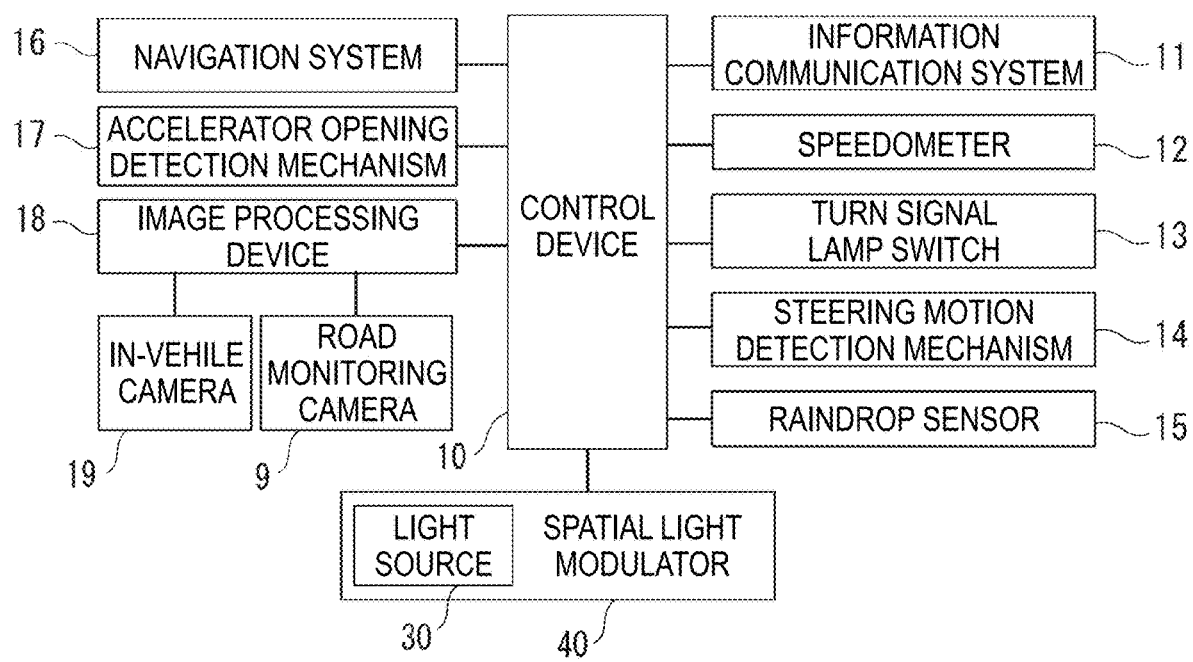

FIG. 14 is a block diagram showing a configuration of a vehicle head lamp.

(A) of FIG. 15 is a diagram showing a basic light distribution pattern. (B) of FIG. 15 shows a change in a luminous intensity along a line B-B in (A) of FIG. 15.

(A1) and (A2) of FIG. 16 are examples of a light distribution pattern. (B1) of FIG. 16 shows a change in a luminous intensity along a line B-B in (A1) of FIG. 16. (B2) of FIG. 16 shows a change in a luminous intensity along a line B-B in (A2) of FIG. 16.

(A1) and (A2) of FIG. 17 are examples of a light distribution pattern. (B1) of FIG. 17 shows a change in a luminous intensity along a line B-B in (A1) of FIG. 17. (B2) of FIG. 17 shows a change in a luminous intensity along a line B-B in (A2) of FIG. 17.

Figure 18:
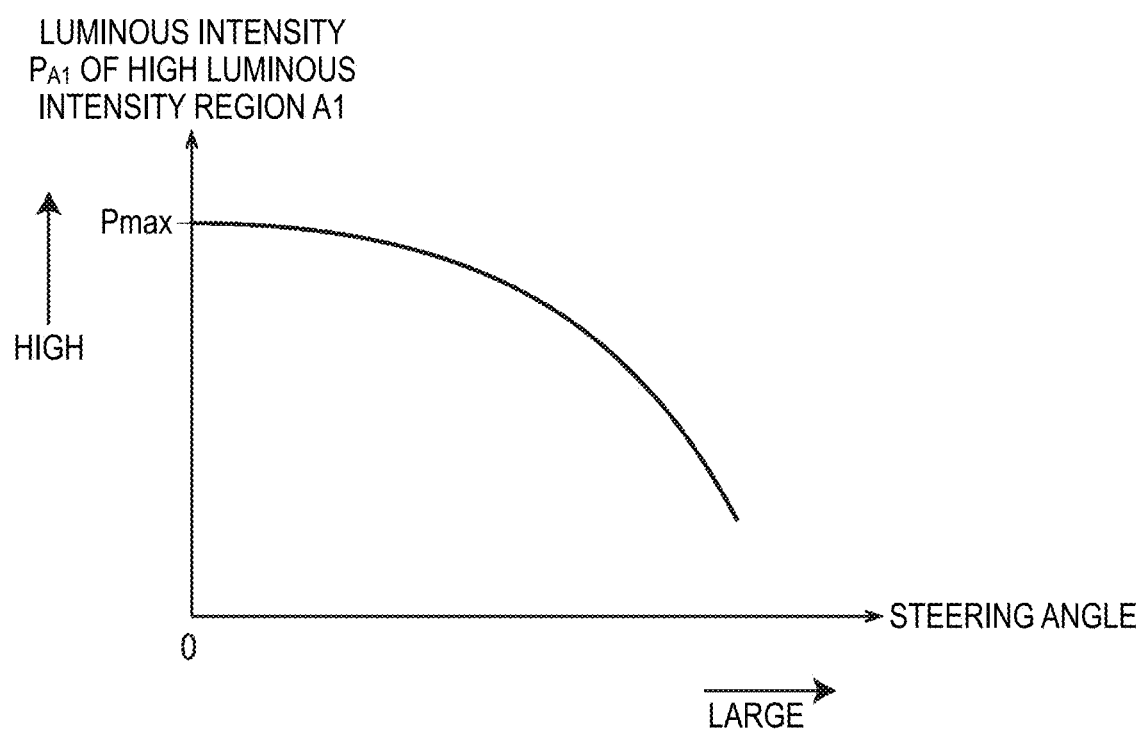

FIG. 18 shows a change in a luminous intensity of a high luminous intensity region A1 with respect to a steering angle of steering.

Figure 19:
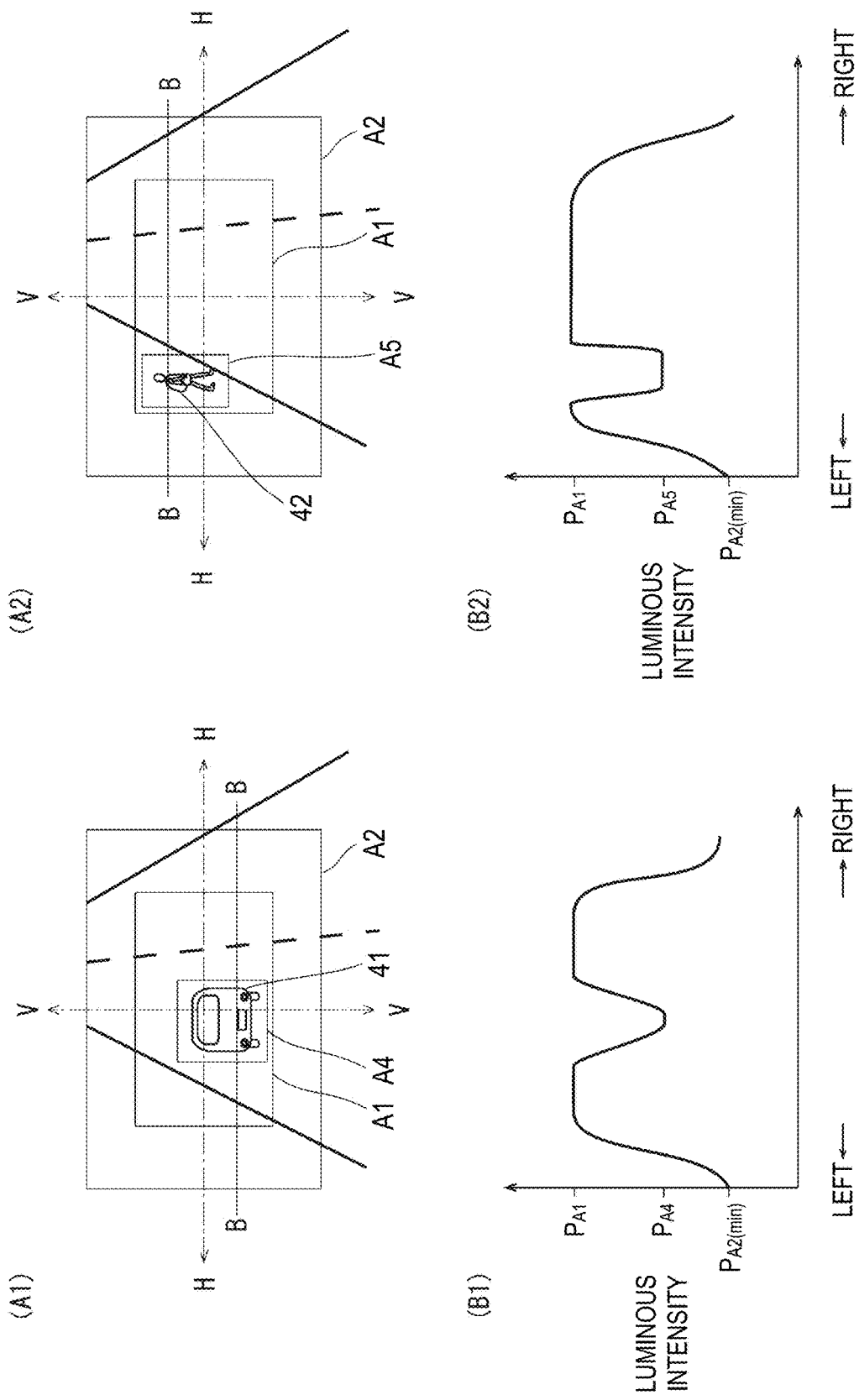

(A1) and (A2) of FIG. 19 are examples of a light distribution pattern. (B1) of FIG. 19 shows a change in a luminous intensity along a line B-B in (A1) of FIG. 19. (B2) of FIG. 19 shows a change in a luminous intensity along a line B-B in (A2) of FIG. 19.

Figure 20:
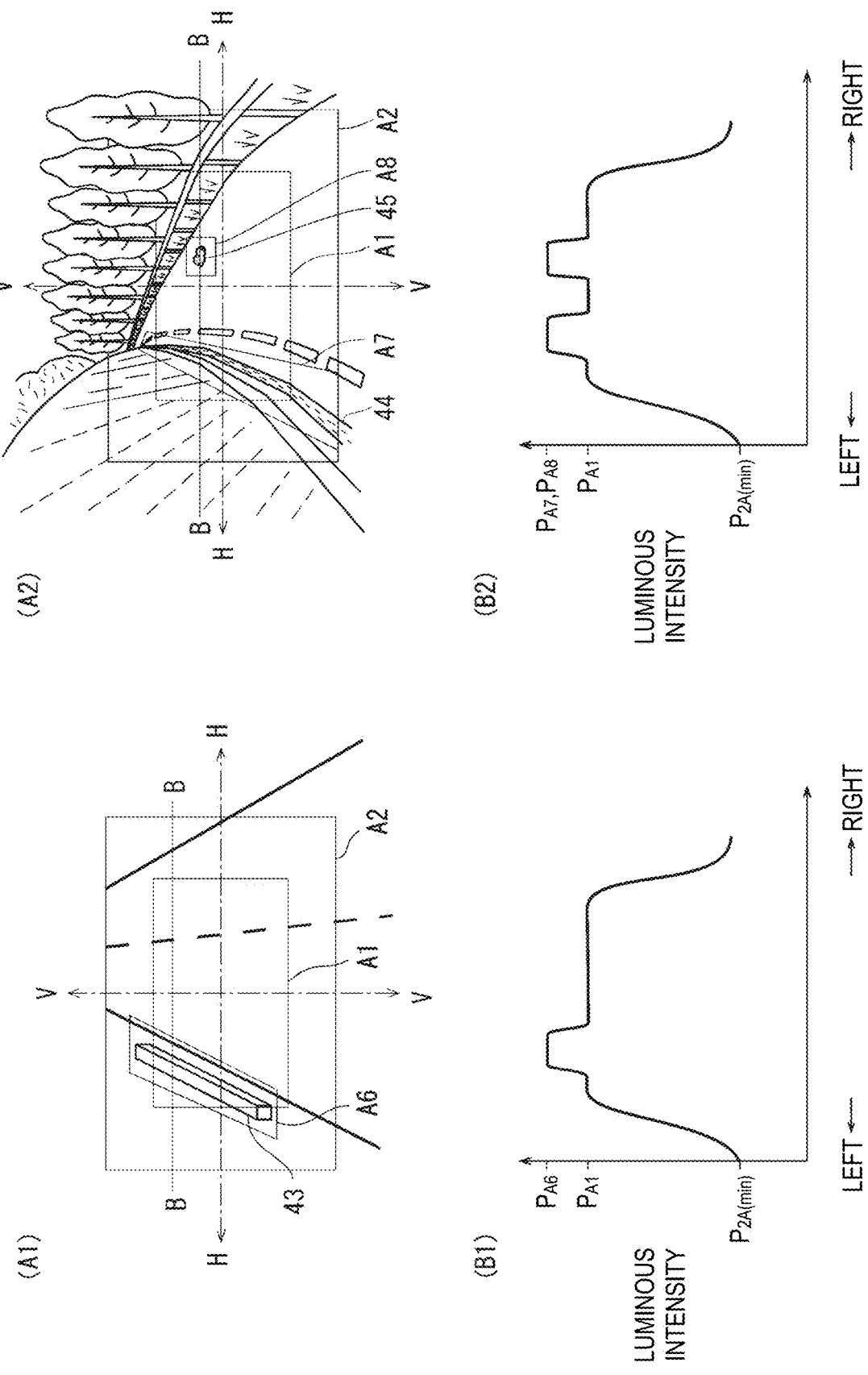

(A1) and (A2) of FIG. 20 are examples of a light distribution pattern. (B1) of FIG. 20 shows a change in a luminous intensity along a line B-B in (A1) of FIG. 20. (B2) of FIG. 20 shows a change in a luminous intensity along a line B-B in (A2) of FIG. 20.

Figure 21:
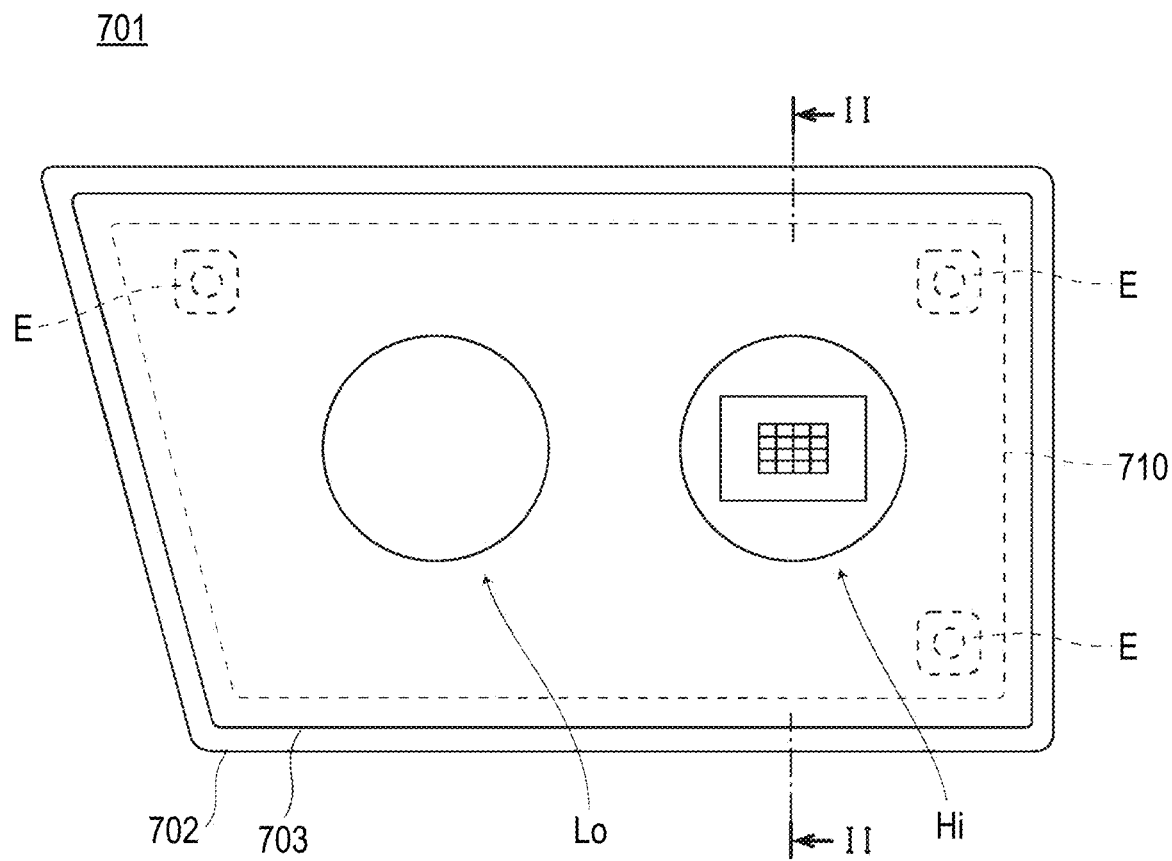

FIG. 21 is a front view showing a schematic structure of another configuration example of the vehicle head lamp of the present disclosure.

FIG. 22 is a vertical cross-sectional view taken along a line II-II in FIG. 21.

DESCRIPTION OF EMBODIMENTS

Hereinafter, suitable embodiments of the present invention will be described with reference to the drawings. The embodiments are exemplification rather than limiting the invention, and all features and combinations thereof described in the embodiments are not necessarily essential to the invention.

(Configuration of Head Light)

Figure 1:
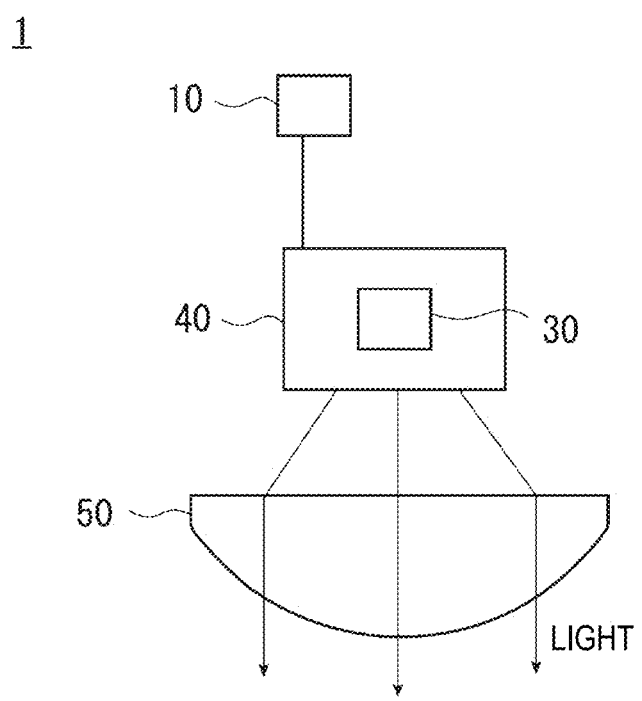
FIG. 1 is a schematic diagram for illustrating a vehicle head lamp according to the present disclosure.

FIG. 1 schematically shows a vehicle head lamp according to an embodiment of the present disclosure. A vehicle head lamp 1 is a right side head lamp, and includes a spatial light modulator 40 having a light source 30 in a lamp chamber, a control device 10, and a projection optical member 50.

The light source 30 is a semi-conductor light emitting element such as a light emitting diode (LED), a laser diode (LD), or an electro luminescence (EL) element, a light bulb, an incandescent lamp (halogen lamp), a discharge tube (discharge lamp), or the like, and a light source fitted to a specific configuration of the spatial light modulator 40 to be described below is used.

The projection optical member 50 includes, for example, a free-form surface lens with a front side surface and a rear side surface each having a free-form surface shape, and projects a light source image formed on a rear focal plane including a rear focal point of the projection optical member 50 onto a virtual vertical screen in front of the vehicle head lamp 1 as an inverted image. The projection optical member 50 is disposed such that a rear focal point thereof is positioned in the vicinity of a light emitting surface (or a reflective surface) of the spatial light modulator 40.

The spatial light modulator 40 can form a desired drawing pattern by using irradiation light of the light source 30, and is disposed on an optical axis of the projection optical member 50. The drawing pattern formed by the spatial light modulator 40 is projected as a light distribution pattern on a front surface of the vehicle via the projection optical member 50.

The control device 10 controls the spatial light modulator 40 and the light source 30 provided in the spatial light modulator 40 to form a high luminous intensity region A1 and a low luminous intensity region A2 having a luminous intensity lower than that of the high luminous intensity region A1 in a desired light distribution pattern. In addition, the control device 10 determines a light distribution pattern in accordance with traveling status of the equipped vehicle, and relatively changes at least one of the sizes, luminous intensities, and positions of the high luminous intensity region A1 and the low luminous intensity region A2 (to be described below).

First Embodiment: Example Using Scanning Mechanism

Figure 2:
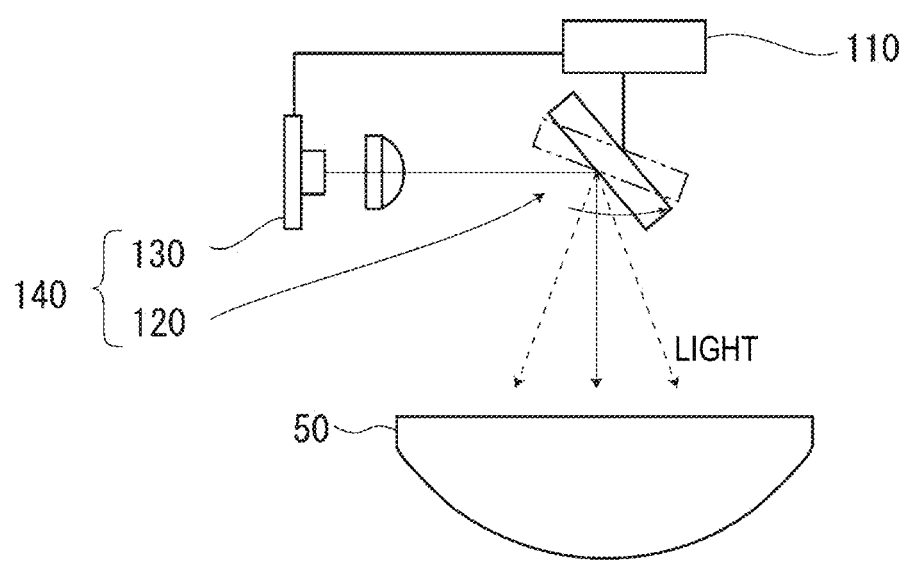
FIG. 2 is a plan view of a vehicle head lamp (including a scanning mechanism) according to a first embodiment.

A specific embodiment of the spatial light modulator 40 is described. FIG. 2 shows a vehicle head lamp 101 according to a first embodiment, and uses a scanning mechanism 140 as the spatial light modulator 40.

The scanning mechanism 140 includes a light source 130 and a scanning mechanism body 120. The light source 130 is, for example, a laser diode. The light emitted from the light source 130 is collected by a light collecting lens and is incident on the scanning mechanism body 120 as parallel light. The scanning mechanism body 120 has a reflective mirror pivotably supported in two axial directions, and forms a desired drawing pattern by performing scanning with the light reflected while pivoting the reflective mirror.

Figure 3:
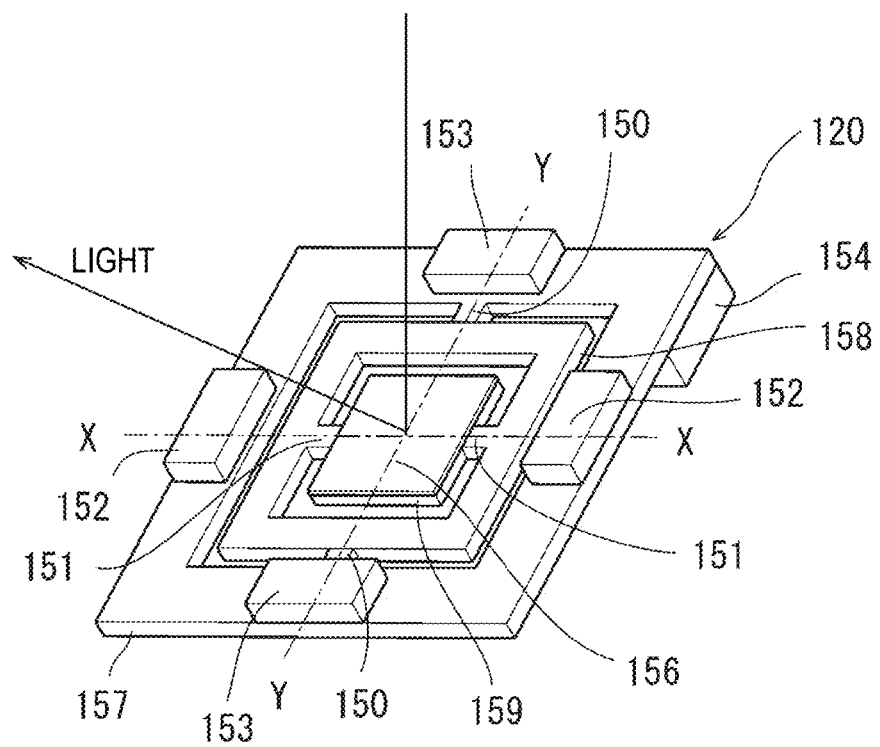
FIG. 3 is a perspective view showing a scanning mechanism body.

FIG. 3 is a perspective view of the scanning mechanism body 120. In the present embodiment, a micro electro mechanical systems (MEMS) mirror is used as an example.

The scanning mechanism body 120 includes a base 157, a first pivot body 158, a second pivot body 159, a first torsion bar 150, a second torsion bar 151, a pair of first permanent magnets 152, a pair of second permanent magnets 153, and a terminal portion 154. The second pivot body 159 is a reflective mirror formed in a plate shape, and a reflective surface 156 is formed on a front surface of the second pivot body 159 by silver deposition, sputtering processing, or the like.

The plate-shaped first pivot body 158 is supported by the first torsion bar 150 so as to pivot left and right (around Y axis), and the second pivot body 159 is supported by the first pivot body 158 in a state of being pivotable up and down (around X axis) by the pair of second torsion bars 151. The pair of first permanent magnets 152 and the pair of second permanent magnets 153 are respectively provided on the base 157 in directions in which the pair of first and second torsion bars (150, 151) extend. The pair of first and second pivot bodies (158, 159) are respectively provided with first and second coils (not shown) which are energized via the terminal portion 154. The first and second coils (not shown) are subjected to independent electrical transmission control separately by the control device 110.

The first pivot body 158 is tilted back and forth about an axis line (Y line) of the first torsion bar based on energization ON/OFF of the first coil (not shown), and the second pivot body 159 is tilted back and forth about an axis line (X axis) of the second torsion bar 151 based on energization ON/OFF of the second coil (not shown). The reflective surface 156 is tilted up, down, left, and right based on electrical transmission to the first or second coil (not shown) to reflect incident light from the light source 130.

The control device 110 controls output of the light source 130 and the energization of each coil of the scanning mechanism body 120. That is, the control device 110 controls a timing of turning on and off the light source 130, luminance of the light source 130, and a pivot direction, a pivot range, and a pivot speed of the reflective surface 156 of the scanning mechanism body 120.

The scanning mechanism body 120 is disposed at a position where the light emitted from the light source 130 can be reflected by the reflective surface 156 and incident on the projection optical member 50. The scanning mechanism body 120 scans an incident surface of the projection optical member 50 with light by reciprocating motion of the reflective surface 156. The light with which scanning is performed is overlapped and formed as a drawing pattern, and to a desired projection place is irradiated via the projection optical member 50.

The control device 110 may control emission of light from the light source 130 in accordance with the scanning with light by the scanning mechanism body 120. For example, the scanning mechanism body 120 rotates the reflective surface 156 so that the rotation position of the reflective surface 156 is in a range wider than a region related to a drawing pattern to be formed. Further, the control device 110 turns on the light source 130 when the rotation position of the reflective surface 156 is at a position corresponding to the region related to the drawing pattern to be formed. Even by such control, a desired drawing pattern can be formed.

Figure 4:
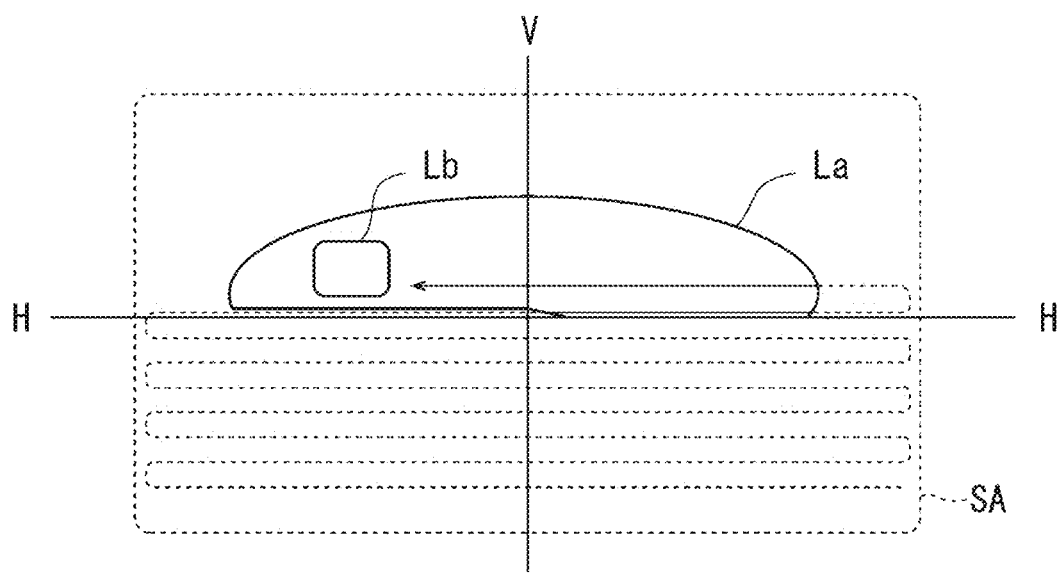
FIG. 4 is a diagram showing an example of a lighting region of a drawing pattern.

FIG. 4 is a diagram showing a lighting region La related to a low beam distribution which is an example of a drawing pattern formed by the scanning mechanism 140. The lighting region La is formed on the incident surface of the projection optical member 50.

The scanning mechanism 140 according to the present embodiment can scan a rectangular scanning range SA with light. The control device 110 turns on the light source 130 when a scanning position of the scanning mechanism 140 is within the lighting region La, and turns off the light source 130 when the scanning position of the scanning mechanism 140 is outside the lighting region La. The lighting region La in which line images are vertically overlapped passes through the projection optical member 50 and is irradiated on a road surface in front of the vehicle. The lighting region La is vertically and horizontally inverted and projected via the projection optical member 50, and is formed as a low beam distribution.

Here, for example, when a region Lb in the lighting region La is scanned with light, the control device 110 performs control of decreasing the luminance of the light source 130, and thus the low luminous intensity region A2 having a luminous intensity lower than other regions can be formed in a light distribution pattern to be formed. Alternatively, the control device 110 performs control of increasing the luminance of the light source 130 only when the region Lb is scanned with light, and thus the high luminous intensity region A1 having a luminous intensity higher than other regions can also be formed in a light distribution pattern to be formed. The luminance of the light source 130 is gradationally controlled by output adjustment of the control device 110, and the luminance of the light source 130 is controlled in accordance with a timing of scanning with light, whereby a region having a desired luminous intensity gradient can be formed in the light distribution pattern.

Alternatively, by adjusting the pivot speed of the reflective surface 156, the low luminous intensity region A2/the high luminous intensity region A1 can be formed in the desired light distribution pattern. When the scanning speed of light is slow, a spectrum thereof remains for a long time as an afterimage, so that the luminous intensity of the light distribution pattern to be formed is increased. Only when the region Lb is scanned with light, the control device 110 performs control of decreasing the pivot speed of the reflective surface 156, so that the high luminous intensity region A1 can be formed in the low beam distribution. Conversely, when control is performed to increase the pivot speed of the reflective surface 156 in the region Lb, the low luminous intensity region A2 is formed in the low beam distribution. By adjusting an energization amount of the first and second coils (not shown), the luminous intensity of the light distribution pattern to be formed can be controlled.

Second Embodiment: Example Using Rotation Mechanism

Figure 5:
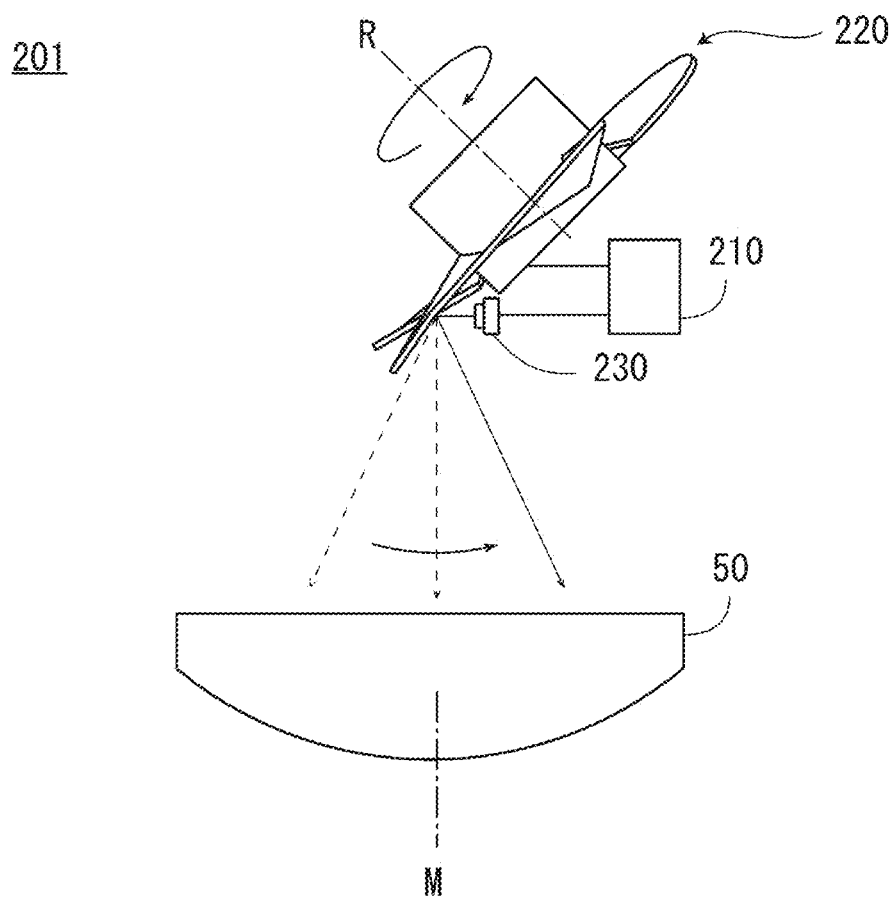
FIG. 5 is a plan view of a vehicle head lamp (including a rotation mechanism) according to a second embodiment.
Figure 6:
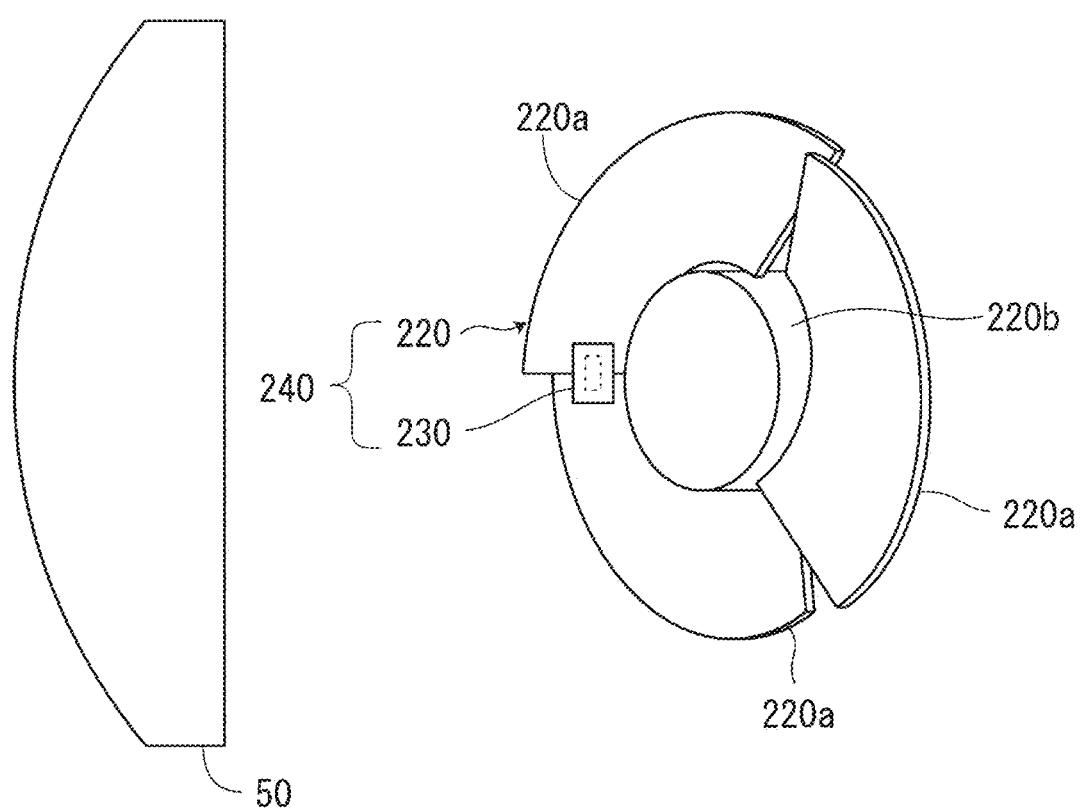
FIG. 6 is a right side view of the vehicle head lamp.

The spatial light modulator 40 is not limited to the scanning mechanism 140, and other configurations can be used. FIG. 5 and FIG. 6 show a vehicle head lamp 201 according to a second embodiment, and show a configuration using a rotation mechanism 240 as the spatial light modulator 40. In FIG. 6, a control device 210 is omitted.

The rotation mechanism 240 includes a rotary reflector 220 and a light source 230. The rotary reflector 220 is rotated in one direction about a rotation axis R by a drive source such as a motor not shown. The rotary reflector 220 includes a reflective surface configured to reflect light emitted from the light source 230 while rotating and to form a desired light distribution pattern.

The rotary reflector 220 is provided with three blades 220a that have the same shape and function as reflective surfaces around a tubular rotation portion 220b. The rotation axis R of the rotary reflector 220 is oblique to an optical axis M, and is provided in a plane including the optical axis M and the light source 230. In other words, the rotation axis R is provided substantially parallel to a scanning plane of light (irradiation beam) of the light source 230 that performs scanning in a horizontal direction by rotation. Here, the scanning plane can be taken as, for example, a fan-shaped plane formed by continuously connecting trajectories of light of the light source 230 which is scanning light.

A shape of a blade 220a of the rotary reflector 220 is configured such that a secondary light source of the light source 230 due to reflection is formed in the vicinity of a focal point of the projection optical member 50. Further, the blade 220a has a twisted shape such that an angle formed between the optical axis M and the reflective surface changes as the blade 220a moves in a circumferential direction about the rotation axis R. Accordingly, the rotary reflector 220 can scan the front of the vehicle in the horizontal direction by using light of the light source 230.

With the configuration as described above, the rotation mechanism 240 reflects light of the light source 230 by the rotary reflector 220 and scans the front with the reflected light, so that a light distribution pattern having an oblong shape in a substantially horizontal direction can be formed.

The control device 210 controls a timing of turning on and off the light source 230, luminance of the light source 230, and a rotation speed of the rotary reflector 220. Here, a desired light distribution pattern can be formed by synchronizing changes in the luminance of the light source 230 and the timing of turning on and off the light source 230 with rotation of the rotary reflector 220.

That is, similarly to the scanning mechanism 140, when a predetermined region in a desired light distribution pattern is scanned with light, the low luminous intensity region A2/the high luminous intensity region A1 can be formed in the light distribution pattern by performing control of decreasing/increasing the luminance of the light source 230. Alternatively, the low luminous intensity region A2/the high luminous intensity region A1 may be formed by increasing/decreasing the rotation speed of the rotary reflector 220. Since the rotation speed is gradationally controlled, a luminous intensity gradient of the light distribution pattern to be formed can be controlled.

Figure 7:
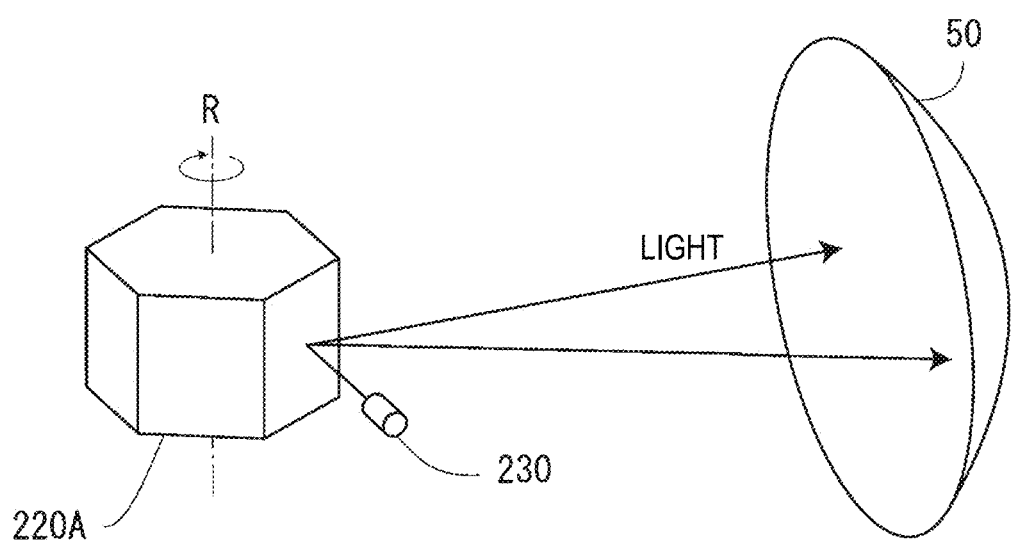
FIG. 7 is a modification of the vehicle head lamp.

FIG. 7 shows a configuration using a polygon mirror 220A as a modification of the rotation mechanism 240. The polygon mirror 220A having a substantially polygonal prism shape has a rotation axis R in a vertical direction, and reflects light emitted from the light source 230 disposed in a horizontal direction on a side surface functioning as a reflective surface while rotating, and scans reflective light in the horizontal direction to form a light distribution pattern.

Figure 8:
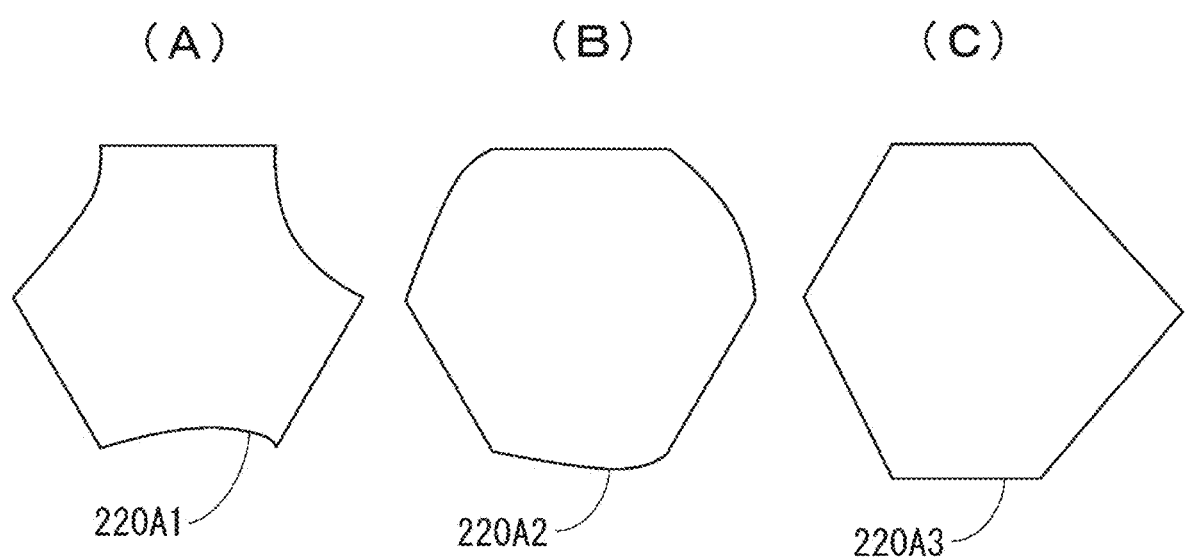
FIG. 8 is a plan view showing an example of a polygon mirror which is a modification of the vehicle head lamp.

FIG. 8 is a plan view showing an example of the polygon mirror 220A. In the configuration known in the related art, a polygon mirror has a regular polygonal prism shape, but in the present embodiment, the polygon mirror is a non-regular polygonal prism in which part of side surfaces are curved surfaces instead of planes, or side surfaces have different sizes even if the side surface is a plane. Since the side surface which is a reflective surface is curved, a speed of the scanning light is not constant but is locally slow/fast, or the reflective light is dispersed/concentrated by an uneven plane, and the local low luminous intensity region A2/high luminous intensity region A1 is formed in a desired light distribution pattern.

As in polygon mirrors 220A1 and 220A2, a curvature of the side surface is made different for each curved surface, or as in a polygon mirror 220A3, a polygonal prism having a different length (size) of one side may be used instead of a regular polygonal prism, and various shapes can be used.

Third Embodiment: Example Using Matrix LED

Figure 9:
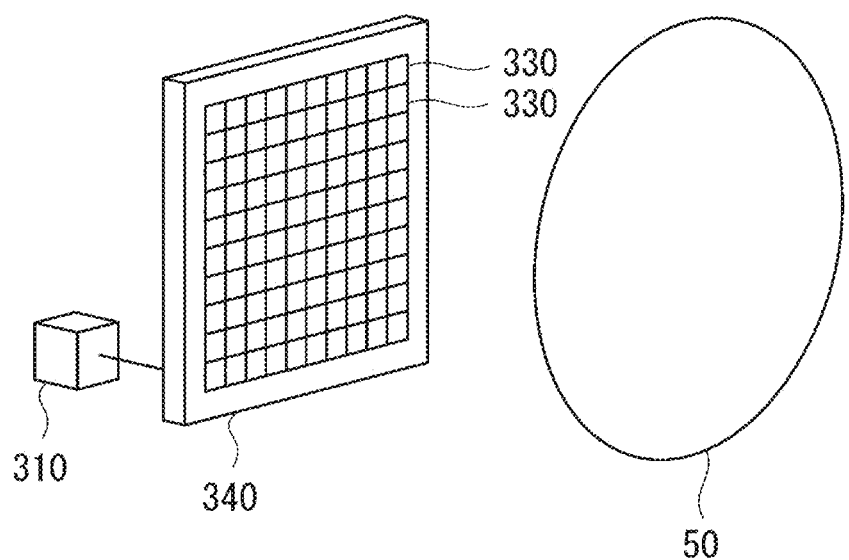
FIG. 9 is a perspective view of a vehicle head lamp (including a light source unit) according to a third embodiment.

FIG. 9 shows a vehicle head lamp 301 according to a third embodiment, and shows a configuration in which a matrix LED 340 is used as the spatial light modulator 40.

In the matrix LED 340, a plurality of light sources 330 are arranged in a matrix form, so that a timing of turning on and off each light source 330 and a lighting intensity (luminance) of each light source 330 are individually controlled with a control device 310. The light source 330 is, for example, a white LED. A desired light distribution pattern can be formed by selecting which light source 330 is turned on and adjusting the luminance of the light source 330 to be turned on.

For example, by controlling the luminance of the light source 330, which contributes to formation of a region in the desired light distribution pattern, to be lower/higher than others, the low luminous intensity region A2/the high luminous intensity region A1 can be formed in the light distribution pattern.

In addition, instead of luminance adjustment, a luminous intensity gradient can be expressed by setting luminance of all the light sources 330 the same and thinning out the light sources 330 to be turned on. That is, it is also possible to control the luminous intensity of the light distribution pattern and form the low luminous intensity region A2/the high luminous intensity region A1 by setting a rate of light sources to be actually turned on among the light sources 330 present per unit area of the matrix LED 340 as a first lighting rate E1 and controlling the first lighting rate E1 of a predetermined region of the matrix LED 340 corresponding to a region in the desired light distribution pattern to be lower/higher than the first lighting rate E1 in other regions.

Fourth Embodiment: Example Using Transmissive Liquid Crystal Device

Figure 10:
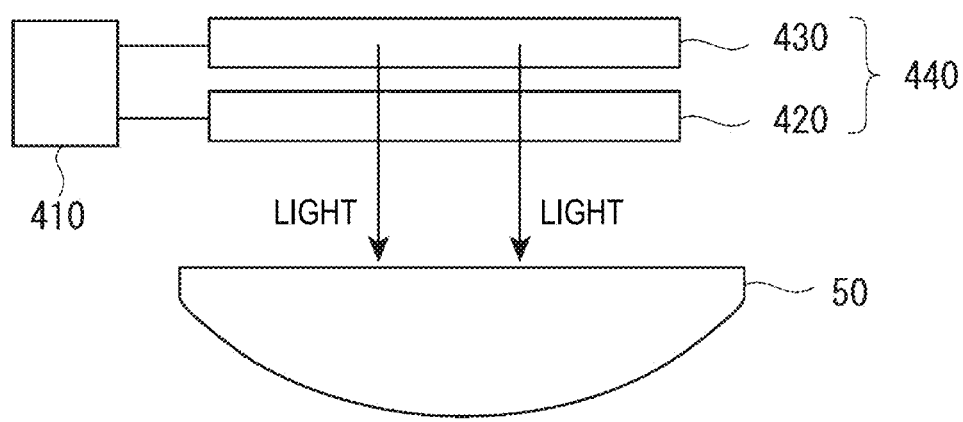
FIG. 10 is a plan view of a vehicle head lamp (including a transmissive liquid crystal device) according to a fourth embodiment.

FIG. 10 shows a vehicle head lamp 401 according to a fourth embodiment, and shows a configuration in which a transmissive liquid crystal device 440 is used as the spatial light modulator 40.

The transmissive liquid crystal device 440 includes a back light 430 that emits white light as a light source and a first liquid crystal layer 420. Since a plurality of individual color filters for different light colors are not provided, a single color transmissive liquid crystal device is configured to have a high light transmittance.

The first liquid crystal layer 420 is disposed in front of a surface irradiated with light of the back light 430 and at a rear focal position of a back surface of the projection optical member 50. The back light 430 can use a back light known in the related art such as a fluorescent lamp or an LED. The first liquid crystal layer 420 includes two polarizing filters arranged to rotate by 90 degrees with respect to each other, and liquid crystal elements formed in a matrix shape arranged between the two polarizing filters. By adjusting a voltage applied to the liquid crystal element, it is possible to create a first state in which a transmittance of light that transmits the incident light from the back light 430 is high and a state in which a transmittance of light that does not transmit the incident light is low. In these two states, an intermediate state can be gradationally created by a magnitude of the applied voltage (the transmittance can be gradationally changed for each unit element of the liquid crystal element), and luminous intensity of light with which the front of the vehicle is irradiated can be adjusted by adjusting a transmittance of light of the first liquid crystal layer 420. The control device 410 controls a voltage independently for each unit element (pixel) of a matrix of the liquid crystal elements, so that a desired monochrome image (the light distribution pattern in the present embodiment) can be formed. As the transmissive liquid crystal device 440, not only such a TN type liquid crystal but also a widely known liquid crystal display device can be used.

In a region in the light distribution pattern formed here, a voltage applied to the first liquid crystal layer 420 (liquid crystal element) at a position corresponding to the region is lower/higher than applied voltages of other regions, so that the low luminous intensity region A2/the high luminous intensity region A1 can be formed in the light distribution pattern by decreasing/increasing the transmittance of the light incident from the back light 430.

Alternatively, if the voltage applied to the liquid crystal element is uniform in any region, density of light can be expressed by thinning out the liquid crystal elements of the first liquid crystal layer 420 to be turned on. That is, the low luminous intensity region A2/the high luminous intensity region A1 can be formed in a predetermined light distribution pattern by setting a rate of unit elements that transmit light among unit elements (pixels) present per unit area of the first liquid crystal layer 420 as a second lighting rate E2 and controlling the second lighting rate E2 in a region of the first liquid crystal layer 420 to be lower/higher than that in other regions.

Fifth Embodiment: Example Using Reflective Liquid Crystal Device

Figure 11:
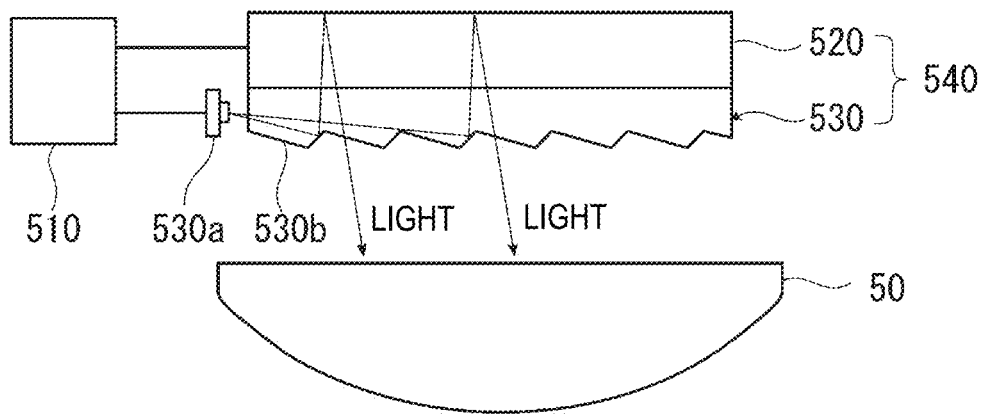
FIG. 11 is a plan view of a vehicle head lamp (including a reflective liquid crystal device) according to a fifth embodiment.

FIG. 11 shows a vehicle head lamp 501 according to a fifth embodiment, and shows a configuration in which a reflective liquid crystal device 540 is used as the spatial light modulator 40.

The reflective liquid crystal device 540 includes a front light 530 having properties of emitting white light as a light source and transmitting light, and a second liquid crystal layer 520 disposed on a back surface of the front light 530.

The second liquid crystal layer 520 includes two polarizing filters rotatable by 90 degrees with respect to each other, liquid crystal elements formed in a matrix shape arranged between the two polarizing filters, and a reflective film made of aluminum and formed on a surface facing a front surface on which the front light 530 is disposed. Similarly to the first liquid crystal layer 420, by adjusting a magnitude of a voltage applied to the liquid crystal element, an intermediate state between a first state in which a transmittance of light of transmitting incident light is high and a second state in which a transmittance of not transmitting the incident light is low can be created gradationally. The control device 510 controls a voltage independently for each unit element (pixel) of a matrix of the liquid crystal elements, so that a desired monochrome image (the light distribution pattern in the present embodiment) can be formed by using the voltage. Unlike the first liquid crystal layer 420, since a reflective film is provided, the formed light is reflected by the reflective film toward the front light 530 which is an incident surface of the light, transmits the front light 530, and is emitted from an exposed surface of the front light 530. That is, light reflectance of the second liquid crystal layer 520 can be controlled by controlling the voltage applied to the liquid crystal element.

The front light 530 can use a front light known in the related art, and uses a side light type including an LED 530a and a light guide body 530b as an example in the present embodiment. The light guided from the LED 530a propagates while being reflected in the light guide body 530b and is incident on the second liquid crystal layer 520, and a part of the light is reflected by the reflective film of the second liquid crystal layer 520, is incident on the front light 530 again, and is emitted to the outside from a surface of the front light 530. Unevenness is formed on a surface of the light guide body 530b so that the light guided to the light guide body 530b is efficiently incident on the second liquid crystal layer 520. The unevenness of the light guide body 530b may be finely processed. The front light 530 may use an optical system that causes light from the light source to be incident on the second liquid crystal layer 520.

In a region in the light distribution pattern formed by the reflective liquid crystal device 540 here, a voltage applied to the liquid crystal element at a position corresponding to formation of the region is lower/higher than voltages applied to other liquid crystal elements, so that the low luminous intensity region A2/the high luminous intensity region A1 can be formed by decreasing/increasing the transmittance of the light incident from the back light 530 on the second liquid crystal layer 520.

Alternatively, if the voltage applied to the liquid crystal element is uniformly equal, density of light can be expressed by thinning out unit elements of the second liquid crystal layer to be turned on. That is, the low luminous intensity region A2/the high luminous intensity region A1 can be formed in a predetermined light distribution pattern by setting a rate of pixels that reflect light among unit elements (pixels) of liquid crystal elements present per unit area of the second liquid crystal layer 520 as a third lighting rate E3 and controlling the third lighting rate E3 in a region of the second liquid crystal layer to be lower/higher than that in other regions.

Sixth Embodiment: Example Using Light Deflection Device

Figure 12:
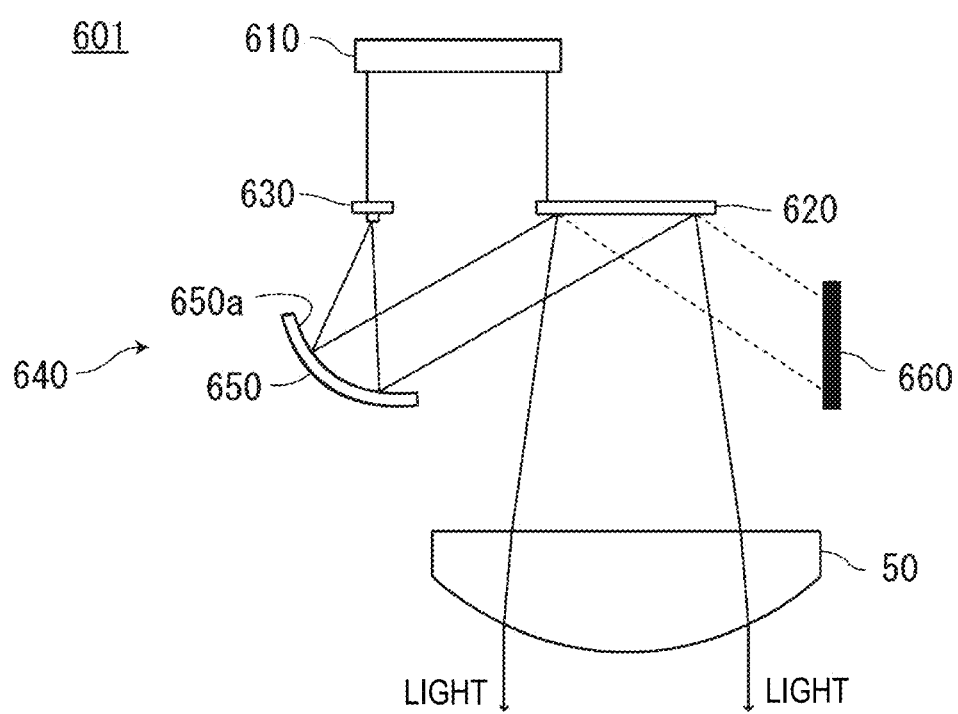
FIG. 12 is a plan view of a vehicle head lamp (including a light deflection device) according to a sixth embodiment.

FIG. 12 shows a vehicle head lamp 601 according to a sixth embodiment, and shows a configuration in which a light deflection device 640 is used as the spatial light modulator 40.

The light deflection device 640 includes a light source 630, a reflective optical member 650, a light deflection device body 620, and a light absorption member 660.

The reflective optical member 650 is configured to guide light emitted from the light source 630 to a reflective surface of the light deflection device body 620, and a reflective mirror whose inner surface is a predetermined reflective surface 650a is used. When the light emitted from the light source 630 is directly guided to the light deflection device body 620, the reflective optical member 650 may not be provided.

The light deflection device body 620 is disposed on an optical axis of the projection optical member 50, and is configured to selectively reflect the light emitted from the light source 630 to the projection optical member 50.

The optical deflection device body 620 is formed by arranging a plurality of minute mirror elements 621 on the surface in a matrix form. A reflection direction of the light emitted from the light source 630 can be selectively changed by controlling angles of reflective surfaces of the plurality of mirror elements 621 respectively. That is, part of the light emitted from the light source 630 can be emitted toward the projection optical member 50, and the other light can be reflected toward a direction in which the light is not effectively used as distributed light. Here, the direction in which the light is not effectively used can be taken as, for example, a direction in which an influence of the reflective light is small (for example, a direction that hardly contributes to formation of a desired light distribution pattern) or a direction toward the light absorption member (light shielding member), and refers to a direction toward the light absorption member 660 in the present embodiment.

A surface of the light absorption member 660 is subjected to non-reflective coating, and the light absorption member 660 absorbs the reflected light from the light deflection device body 620 without reflection or transmission.

The light emitted from the light source 630 is reflected by the reflective surface 650a of the reflective optical member 650 to the light deflection device body 620, and part of the light is reflected forward by the light deflection device body 620 (the other light is reflected toward the light absorption member 660 and absorbed), passes through the projection optical member 50, and is emitted to the front of the vehicle.

The light deflection device body 620 is described in detail. As shown in (A) of FIG. 13, the optical deflection device body 620 includes a micromirror array 622 in which a plurality of minute mirror elements 621 are arranged in a matrix form. The mirror element 621 is a quadrilateral (a square, a rhombus, a rectangle, a parallelogram, or the like), and has a reflective surface 621a that reflects light on a surface thereof. The optical deflection device body 620 includes a transparent cover member 623 disposed on a front side of the reflective surface 621a of the mirror element 621. The cover member 623 is, for example, glass, plastic, or the like.

Each mirror element 621 of the micromirror array 622 is configured to be switchable between an ON state (a solid line position shown in (B) of FIG. 13) as a first state in which light emitted from the light source 630 is reflected toward the projection optical member 50 so as to be used as a desired light distribution pattern and an OFF state (a broken line position shown in (B) of FIG. 13) as a second state in which light emitted from the light source 630 is reflected toward the light absorption member 660 so as not to be effectively used as light distribution. ON/OFF control of each mirror element 621 and output intensity adjustment of the light source 630 are controlled by a control device 610.

FIG. 12 shows reflected light (shown by a solid line) by the light deflection device body 620 when the mirror element 621 of the light deflection device body 620 is in the ON state and reflected light (shown by a broken line) when the mirror element 621 is in the OFF state.

Each mirror element 621 has a pivot axis that substantially equally divides the mirror element 621. Each mirror element 621 is configured to be switchable between the ON state and the OFF state about the pivot axis.

By independently controlling the ON/OFF state of each mirror element 621 and selectively changing a reflection position of the light emitted from the light source 630, it is possible to obtain a desired projection image, reflection image, light distribution pattern, or the like.

In addition, although the control of the mirror element 621 is binary control of ON/OFF, gradation expression of light and darkness is possible by adjusting a time ratio of ON/OFF when switching between ON and OFF is performed at high speed or density of the mirror element 621 in the ON state by increasing or decreasing the mirror element 621 in the ON state in a certain area. That is, gradation of a projected image can be expressed in a gray scale.

A rate of the mirror elements 621 in the ON state to the mirror elements 621 present per unit area of the light deflection device body 620 is set as a light deflection rate E4, and in a region in the light distribution pattern formed by the light deflection device 640, the light deflection rate E4 of a mirror element 621 at a position corresponding to formation of the region is controlled to be lower/higher than that in other regions, so that the low luminous intensity region A2/the high luminous intensity region A1 can be formed in the desired light distribution pattern.

Alternatively, a ratio of time to be ON by ON/OFF operation is set as a time ratio E5, and in a region in the light distribution pattern formed by the light deflection device 640, the time ratio E5 of a mirror element 621 at a position corresponding to formation of the region is controlled to be lower/higher than that in other regions, so that the low luminous intensity region A2/the high luminous intensity region A1 can be formed in the desired light distribution pattern.

When a projected image is expressed in color, light source units of three or more colors, such as red, green, and blue, are used in the light source 630 to irradiate the light deflection device body 620 in a time division manner, and each mirror element 621 is turned on at a timing when the light deflection device body 620 is irradiated with a color to be projected. Since the ON/OFF state of the mirror element 621 can be switched at a rate of several thousand times per second, the reflected light of each mirror element 621 is recognized as mixed light due to an illusion of a human eye (afterimage effect). Various color images can be expressed by combining lighting time of each color of the light source unit and the ON/OFF time ratio of the mirror element 621.

Although a specific example has been described as the spatial light modulator 40, the present invention is not limited thereto, and various configurations known in the related art can be used. In addition, methods of forming the low luminous intensity region A2 and the high luminous intensity region A1 of the various spatial modulators 40 can be combined.

(Block Diagram)

Next, a configuration of a control system of the vehicle head lamp 1 centered on the control device 10 is described using FIG. 14. The control device 10 includes elements or circuits commencing with a CPU or a memory of a computer as a hardware configuration, and is realized by a computer program or the like as a software configuration. A control program stored in the memory is executed in the CPU to generate various control signals.

The control device 10 controls the spatial light modulator 40. For example, in the scanning mechanism 140, a desired light distribution pattern is formed by performing control depending on each form, such as a pivot range and a pivot speed of the scanning mechanism body 120, a timing of turning on and off the light source 130, and output adjustment.

A road information communication system 11, a speedometer 12, a turn signal lamp switch 13, a steering motion detection mechanism 14, a raindrop sensor 15, a navigation system 16, an accelerator opening detection mechanism 17, and an image processing device 18 are connected to the control device 10 as devices that inputs information signals to the control device 10. A road monitoring camera 9 and an in-vehicle camera 19 are connected to the image processing device 18.

The road information communication system 11 receives data related to a road surface condition during traveling, such as a rainfall on a road during traveling and a freezing condition of the road via a communication line such as the Internet, and sends the data to the control device 10.

The speedometer 12 detects a traveling speed of an own vehicle, the turn signal lamp switch 13 detects a signal of whether the left or right turn signal lamp is turned on, the steering motion detection mechanism 14 detects a signal of how much steering is turned in the left or right direction, the raindrop sensor 15 detects a signal related to the rainfall when the vehicle is traveling, the navigation system 16 detects a current position of the own vehicle obtained by having, for example, GPS or map data (not shown), and the accelerator opening detection mechanism 17 detects an accelerator step amount to send data signals to the control device 10.

The road monitoring camera 9 includes an intersection camera disposed at an intersection, a monitoring camera which is installed beside a road and captures a road surface condition, a pedestrian, a vehicle such as a bicycle, a motorcycle, or an automobile, an obstacle, or the like on a moving image or a still image, or the like, and the in-vehicle camera 19 includes a camera equipped on the own vehicle or another vehicle and capturing surroundings of the vehicle on a moving image or a still image, or the like. The image processing device 18 is connected to the road monitoring camera 9 via a communication line such as the Internet, and acquires video and image data captured by the road monitoring camera 9. The image processing device 18 sends a video or the like captured by the in-vehicle camera 19, the road monitoring camera 9, or the like as analyzed data to the control device 10.

The control device 10 grasps and analyzes a traveling state of the own vehicle and a state around the own vehicle, such as positions of an facing vehicle, a preceding vehicle, and a pedestrian, a position of a retroreflector such as a sign or a signboard, a road shape, and weather by the data signal received from the detection equipment, determines an appropriate light distribution pattern based on the states, and sends a control signal to the light source 30 and the spatial light modulator 40. This makes it possible to perform optimum light distribution each time.

(Light Distribution Pattern)

(A) of FIG. 15 shows a basic light distribution pattern formed by the vehicle head lamp 1. As shown in (A) of FIG. 15, the control device 10 controls the light source 30 and the spatial light modulator 40 to form a high luminous intensity region A1 having a relatively high luminous intensity and a low luminous intensity region A2 having a luminous intensity lower than that of the high luminous intensity region A1.

The high luminous intensity region A1 is a closed region and has an outer edge which is a boundary line with a peripheral region. The low luminous intensity region A2 is formed adjacent to the outer edge so as to surround the high luminous intensity region A1. The low luminous intensity region A2 is formed in a band shape having an upper end width GU above the high luminous intensity region A1, a lower end width GD below the high luminous intensity region A1, a right end width GR on the right, and a left end width GL on the left. As described above, by the control of the light source 30 and the spatial light modulator 40 in each embodiment by the control device 10, each region is accurately formed in the light distribution pattern.

(B) of FIG. 15 shows a luminous intensity on a line B-B shown in (A) of FIG. 15. The luminous intensity gradually increases from a minimum luminous intensity $P_{min}$, maintains a maximum luminous intensity $P_{max}$, and decreases again to the minimum luminous intensity $P_{min}$ from a left end toward a right end of the light distribution pattern along the line B-B.

The luminous intensity of the low luminous intensity region A2 is similarly configured not only in a horizontal direction but also in a vertical direction, and a luminous intensity $P_{A1}$ has a constant value ($P_{A1}=P_{max}$) in the high luminous intensity region A1, and in the low luminous intensity region A2, a luminous intensity thereof gradually decreases from the maximum luminous intensity $P_{max}$ to the minimum luminous intensity $P_{min}$ from a boundary with the high luminous intensity region A1 toward the outside of the own region. A luminous intensity change in the low luminous intensity region A2 may be linear, but is preferably a smooth curved change having an inflection point in the middle.

In a specific embodiment of the spatial light modulator 40 described above, a simple method of forming the low luminous intensity region A2/the high luminous intensity region A1 has been described, but an actual luminous intensity of the low luminous intensity region A2 is not constant, and has a luminous intensity gradient that changes in a curved manner. In any embodiment, the luminous intensity of the light distribution pattern can be gradationally controlled, for example, when the scanning mechanism 140 is used, gradational control is performed in the low luminous intensity region A2 by gradually decreasing the luminous intensity of light with which scanning is performed (luminance of the light source 30) by the control device 10 from the boundary with the high luminous intensity region A1 toward an outer edge of the low luminous intensity region A2. In addition, for example, when a lighting light source such as the matrix LED 340 is thinned out to express density of light, the luminous intensity can be changed by increasing a thinning out amount toward the outer edge of the region, namely gradually decreasing the first lighting rate E1.

Although the high luminous intensity region A1, namely a so-called spot region, should improve visibility, when a light and darkness boundary line is clearly projected on a road surface, a road sign, or the like, the visibility is reduced, which is converse to the original object. With the configuration described above, the light and darkness boundary is blurred, the spot region is maintained, and the visibility is improved.

Example 1: Highway

In the light distribution pattern formed by the vehicle head lamp 1, based on the light distribution pattern of FIG. 15, sizes, luminous intensities, and positions of the high luminous intensity region A1 and the low luminous intensity region A2 relatively change according to surrounding conditions and a traveling state of the vehicle on which the vehicle head lamp 1 is equipped. FIG. 16 to FIG. 20 show examples of the light distribution pattern.

FIG. 16 shows a light distribution pattern at the time of traveling on a highway as a first example of the light distribution pattern. When the speedometer 12 detects that a vehicle speed exceeds a predetermined value, the control device 10 performs control of decreasing the high luminous intensity region A1 and increasing the luminous intensity $P_{A1}$ of the high luminous intensity region A1.

In (A1) of FIG. 16, as the high luminous intensity region A1 is reduced, the low luminous intensity region A2 is enlarged, and all of the upper end width GU, the lower end width GD, the left end width GL, and the right end width GR are larger than those at the time of low speed. A change in a luminous intensity along a line B-B in (A1) of FIG. 16 is as shown in (B1) of FIG. 16.

In (A2) of FIG. 16, a range of the low luminous intensity region A2 is also reduced as the high luminous intensity region A1 is reduced, the upper end width GU, the lower end width GD, the left end width GL, and the right end width GR are smaller than those at the time of low speed, and a second low luminous intensity region A3 having a luminous intensity lower than that of the low luminous intensity region A2 is formed adjacent to the outer edge of the low luminous intensity region A2. A change in a luminous intensity along a line B-B in (A2) of FIG. 16 is as shown in (B2) of FIG. 16. In the present example, a luminous intensity $P_{A3}$ of the second low luminous intensity region A3 is constant ($P_{A3}=P_{min}$), and similarly to the low luminous intensity region A2, the luminous intensity may be configured to decrease from a boundary line toward an outer edge.

By forming such a light distribution pattern, it is easy to pay attention to surroundings by diffusion irradiation during low-speed driving in a town area or the like, and distant emphasis is made during high-speed driving on a highway or the like, and visibility depending on the condition is improved.

Example 2: Curved Road

FIG. 17 shows a light distribution pattern of a curved road as a second example. A curvature radius of a curved road in (A2) of FIG. 17 is smaller than that of a curved road in (A1) of FIG. 17.

As shown in (A1) and (A2) of FIG. 17, when a signal is received from the steering motion detection mechanism 14, the control device 10 performs control of concentrating a high luminous intensity region A1 in a traveling direction of the curved road (for example, a right side in (A1) and (A2) of FIG. 17) and improving visibility. Changes in luminous intensities along lines B-B in (A1) and (A2) of FIG. 17 are as shown in (B1) and (B2) of FIG. 17, respectively.

Specifically, in order to move the high luminous intensity region A1 in the traveling direction of the curved road, the right end width GR is decreased, the left end width GL is increased, and a luminous intensity $P_{A1}$ of the high luminous intensity region A1 is decreased. With such a configuration, troublesomeness caused by a spot region on the curved road is reduced, and a sense of discomfort in the light distribution of a driver on the curved road is reduced.

In the curved road, the luminous intensity $P_{A1}$ of the high luminous intensity region is determined depending on a steering motion amount, namely a steering angle detected by the steering motion detection mechanism 14. FIG. 18 is a diagram showing a relationship between the luminous intensity $P_{A1}$ of the high luminous intensity region A1 and a steering angle. The luminous intensity $P_{A1}$ is configured to decrease as the steering angle increases. For example, in the embodiment using the scanning mechanism 140, the control device 10 performs control of decreasing an output intensity of the light source 130 or increasing a pivot speed of the scanning mechanism body 120, namely a scanning speed of light. As the steering angle increases, a light and darkness boundary is more likely to be seen (for example, a right end in (A2) of FIG. 17) since the high luminous intensity region A1 moves to an end portion of an area that can be irradiated. By reducing the luminous intensity $P_{A1}$ of the high luminous intensity region A1, it is possible to relieve the sense of discomfort caused by the light and darkness boundary.

Example 3: Dimming Region

FIG. 19 shows a light distribution pattern when a preceding vehicle and a facing vehicle, a pedestrian, or the like is detected by various detection mechanisms of the vehicle as a third example.

As shown in (A1) of FIG. 19, when the preceding vehicle 41 is detected, a relative position to the preceding vehicle 41 is analyzed, and at a time point when illumination light of the vehicle approaches a position where the illumination light reaches the preceding vehicle 41, a dimming region A4 having a low luminous intensity is formed at a position corresponding to the preceding vehicle 41 in the light distribution pattern. The dimming region A4 is not limited to rectangular as long as it is a closed region, and may have any shape such as a round shape. The dimming region A4 can prevent glare given to the preceding vehicle 41 previously. Since the dimming region A4 is determined at a position of the preceding vehicle 41, the dimming region A4 may be formed so as to step over the high luminous intensity region A1 and the low luminous intensity region A2.

A change in a luminous intensity along a line B-B in (A1) of FIG. 19 is as shown in (B1) of FIG. 19. The dimming region A4 is configured to reduce the luminous intensity from an outer edge of the own region toward the inside of the own region. When light is not distributed to the dimming region A4 at all, a boundary line (light and darkness boundary line) with another region stands out, and a sense of discomfort is generated in visibility of the driver. In order to prevent this, the luminous intensity of the dimming region A4 is configured to decrease toward the inside of the region so as to blur the boundary line on purpose.

(A2) of FIG. 19 shows a light distribution pattern when a pedestrian 42 is detected. When the pedestrian 42 is detected by various detection mechanisms provided in the vehicle, a dimming region A5 is formed in the light distribution pattern in order to prevent glare to the pedestrian 42. Similarly to the dimming region A4, the dimming region A5 is configured to reduce the luminous intensity gradually toward the inside. Here, the dimming region A5 formed for the pedestrian 42 is adjusted so as to make the region clearer than the dimming region A4 formed for the preceding vehicle 41.

A change in a luminous intensity along a line B-B in (A2) of FIG. 19 is as shown in (B2) of FIG. 19. Specifically, a luminous intensity gradient, which is a rate of change in a luminous intensity of a part of the dimming region A5 where light is gradually dimmed, is configured to be larger than the luminous intensity gradient of the dimming region A4. When the luminous intensity gradient increases, an effect that the dimming region A5 stands out due to a sudden change in the luminous intensity can be obtained.

In order to prevent glare, a facing vehicle, a preceding vehicle, a retroreflector, and a preceding vehicle are detected, or a pedestrian, a bicycle, or the like is detected. Among the detected objects, the control device 10 adjusts the luminous intensity gradient of the dimming region depending on an importance degree of the object that should call high attention of the driver.

In the present embodiment, the luminous intensities (minimum luminous intensities in the dimming regions) $P_{A4}$ and $P_{A5}$ of the dimming regions A4 and A5 are configured to be equal, and as the importance degree of the detected object increases, the luminous intensities $P_{A4}$ and $P_{A5}$ may be configured to be as low as or lower than the minimum luminous intensity in the dimming region. A dimming region having a luminous intensity further lower than a minimum luminous intensity $P_{A2}$ (min) of the low luminous intensity region A2 may be formed in an object to be more gazed at. As a result, much more attention of the driver can be called.

Example 4: Emphasis Region

FIG. 20 shows a light distribution pattern when an object to be gazed at, such as a curb or a lateral groove of a mountain road at night, is detected as a fourth example.

As shown in (A1) of FIG. 20, when a curb 43 is detected at the time of low visibility such as night, rain, or dense fog, an emphasis region A6 having a high luminous intensity is formed in the light distribution pattern. A change in a luminous intensity along a line B-B in (A1) of FIG. 20 is as shown in (B1) of FIG. 20. By the emphasis region A6, visibility is improved, and the driver can grasp the position of the curb 43.

As shown in (A2) of FIG. 20, when a lateral groove 44 of the mountain road is detected, an emphasis region A7 is formed along the lateral groove 44. At this time, when a fallen rock 45 is detected further forward, a second emphasis region A8 is simultaneously formed in the light distribution pattern. A change in a luminous intensity along a line B-B in (A2) of FIG. 20 is as shown in (B2) of FIG. 20. The emphasis region and the dimming region may be formed two simultaneously in the light distribution pattern, or a plurality of emphasis regions and a plurality of dimming regions may be formed in the light distribution pattern.

The light intensities of the emphasis regions A6, A7, and A8 are configured to be higher than light intensities of surrounding regions, and the visibility is improved and safe driving of the driver is supported.

(Another Configuration Example of Vehicle Head Lamp)

Hereinafter, another configuration example of the vehicle head lamp of the present disclosure is described with reference to the drawings. For members having the same name as the members already described, the contents already described can be adopted as long as no contradiction occurs, and thus description thereof is omitted as appropriate for convenience.

In FIG. 21 and FIG. 22, directions of the vehicle and the vehicle head lamp assumed to be viewed from a driver seat by a driver is described as (upper: lower: left: right: front: rear=Up: Lo: Le: Ri: Fr: Re).

A vehicle head lamp 701 shown in FIG. 21 and FIG. 22 is a right side head lamp and includes a lamp body 702 having an opening portion in the front of the vehicle, and a front cover 703 installed on the opening portion and formed of light transmissive resin, glass, or the like. A lamp chamber is formed inside the lamp body 702 and the front cover 703.

In the lamp chamber, a low beam unit Lo and a high beam unit Hi are disposed side by side in a vehicle width direction. The low beam unit Lo may use a lamp unit having a configuration known in the related art, such as a reflective configuration or a projector configuration, and the type is not limited.

The low beam unit Lo and the high beam unit Hi are installed on the support member 710 separately. The support member 710 is installed on the lamp body 702 by three aiming screws E. Optical axes of both units are adjusted in the horizontal direction and the vertical direction by rotating respective aiming screws E.

An extension reflector 704 disposed in the lamp chamber has an opening portion, and a projection optical member of each unit is exposed forward from the opening portion. By the extension reflector 704, a mechanism part other than the projection optical member of each unit is blindfolded.

The high beam unit Hi includes a light source 705, a reflective optical member 706, a light deflection device 707, a projection optical member 708, and a light absorption member 709. The light source 705 and the light deflection device 707 are directly installed on the support member 710, and the remaining parts are installed on a support member 10 via a fixing member (not shown).

While preferable embodiments and modifications of the present invention have been described, the above embodiments are examples of the present invention, and these embodiments can be combined based on knowledge of those skilled in the art, and such forms are also included in the scope of the present invention.

The present application is based on Japanese Patent Application No. 2018-185203 filed on Sep. 28, 2018 and Japanese Patent Application No. 2019-42217 filed on Mar. 8, 2019, the contents of which are incorporated herein as reference.

The invention claimed is:

1. A vehicle head lamp comprising:
a spatial light modulator having a light source; and a control device that controls the spatial light modulator, wherein
the vehicle head lamp forms a desired light distribution pattern by radiating light emitted from the light source forward via the spatial light modulator,
a high luminous intensity region and a low luminous intensity region that is adjacent to an outer edge of the high luminous intensity region and has a luminous intensity lower than a luminous intensity of the high luminous intensity region are formed in the desired light distribution pattern to be irradiated by controlling the spatial light modulator by the control device,
the low luminous intensity region is configured such that the luminous intensity decreases gradationally from the outer edge of the high luminous intensity region toward an outside of the low luminous intensity region, and
the control device controls the spatial light modulator so as to relatively change at least one of sizes, luminous intensities, and positions of the high luminous intensity region and the low luminous intensity region in accordance with a traveling condition of a vehicle on which the control device is equipped;
the traveling condition of a vehicle comprising detection of speed of the vehicle exceeding a predetermined value or detection of a steering motion.

2. The vehicle head lamp according to claim 1, wherein the spatial light modulator is a scanning mechanism that has a mirror pivotable in two axial directions that reflects light emitted from the light source and performs scanning with the light from the light source reflected while pivoting the mirror, and
the control device controls a timing of turning on and off the light source, luminance of the light source, a pivot direction of the mirror, a pivot range of the mirror, and a pivot speed of the mirror, whereby the scanning light from the scanning mechanism is overlapped to form a desired light distribution pattern.

3. The vehicle head lamp according to claim 2, wherein when a predetermined region in a desired light distribution pattern is scanned with light reflected by the mirror, the control device controls a pivot speed of the mirror to be higher/lower than a pivot speed of the mirror outside the predetermined region in the desired light distribution pattern to form the low luminous intensity region/the high luminous intensity region.

4. The vehicle head lamp according to claim 2, wherein when a predetermined region in a desired light distribution pattern is scanned with light reflected by the mirror, the control device controls luminance of the light source to be higher/lower than luminance of the light source outside the predetermined region in the desired light distribution pattern to form the low luminous intensity region/the high luminous intensity region.

5. The vehicle head lamp according to claim 1, wherein the spatial light modulator is a rotation mechanism that rotates in one direction around a rotation axis while reflecting the light emitted from the light source, and has a rotary reflector provided with a reflective surface that performs scanning with light of the light source reflected while rotating, and
the control device controls a timing of turning on and off the light source, luminance of the light source, and a rotation speed of the rotary reflector, whereby a predetermined region is irradiated with reflected light from the rotary reflector to form a desired light distribution pattern.

6. The vehicle head lamp according to claim 5, wherein when the predetermined region in a desired light distribution pattern is scanned with light reflected by the rotary reflector, the control device controls a rotation speed of the rotary reflector to be higher/lower than a rotation speed of the rotary reflector when the outside of the predetermined region in the desired light distribution pattern is scanned to form the low luminous intensity region/the high luminous intensity region.

7. The vehicle head lamp according to claim 5, wherein when a predetermined region in a desired light distribution pattern is scanned with light reflected by the rotary reflector, the control device controls luminance of the light source to be higher/lower than luminance of the light source when the outside of the predetermined region in the desired light distribution pattern is scanned with the reflected light to form the low luminous intensity region/the high luminous intensity region.

8. The vehicle head lamp according to claim 5, wherein the rotary reflector has a plurality of curved reflective surfaces configured such that a scanning speed of the reflected light is locally fast or slow, and the low luminous intensity region/the high luminous intensity region is formed by local dispersion/concentration of the reflected light.

9. The vehicle head lamp according to claim 1, wherein
the spatial light modulator is a light source unit in which
  a plurality of light sources that are individually and
  independently controllable are arranged in a matrix
  shape, and
the control device individually controls turning on and off
  of the light source and luminance of the light source to
  form a desired light distribution pattern from irradiation
  light of the light source.

10. The vehicle head lamp according to claim 9, wherein
in the light source unit, a ratio of light sources to be
  actually turned on among the light sources present per
  unit area is set as a first lighting rate, and the control
  device controls the first lighting rate of a part corresponding to formation of a predetermined region in the
  desired light distribution pattern to be lower/higher
  than the first lighting rate of a part corresponding to the
  outside of the predetermined region in the desired light
  distribution pattern to form the low luminous intensity
  region/the high luminous intensity region.

11. The vehicle head lamp according to claim 9, wherein
the control device controls luminance of the light source
  corresponding to a predetermined region in a desired
  light distribution pattern to be higher/lower than luminance of the light source corresponding to the outside
  of the predetermined region in the desired light distribution pattern to form the low luminous intensity
  region/the high luminous intensity region.

12. The vehicle head lamp according to claim 1, wherein
the spatial light modulator is a transmissive liquid crystal
  device including the light source as a back light and a
  first liquid crystal layer,
the first liquid crystal layer is gradationally switchable for
  each unit element between a first state in which light
  incident from the back light is transmitted and a second
  state in which a change in the light incident from the
  back light is not transmitted depending on a magnitude
  of an applied voltage given, and
the control device controls the voltage applied to the first
  crystal layer for each unit element and controls transmittance of each unit element to form a desired light
  distribution pattern from light emitted from the back
  light and transmitted by the first liquid crystal layer.

13. The vehicle head lamp according to claim 12, wherein
the control device controls an applied voltage in a predetermined part of the first liquid crystal layer corresponding to a predetermined region in a desired light
  distribution pattern to be lower/higher than a voltage
  applied to a part of the first liquid crystal layer corresponding to the outside of the predetermined region in
  the desired light distribution pattern and increases/
  decreases transmittance of light incident from the back
  light to form the low luminous intensity region/the high
  luminous intensity region.

14. The vehicle head lamp according to claim 12, wherein
in the first liquid crystal layer, a ratio of unit elements that
  are in the first state in which light is transmitted among
  unit elements present per unit area is set as a second
  lighting rate, and
the control device controls a second lighting rate in a
  predetermined part of the first liquid crystal layer
  corresponding to a predetermined region in a desired
  light distribution pattern to be lower/higher than a
  second lighting rate in a part of the first liquid crystal
  layer corresponding to the outside of the predetermined
  region in the desired light distribution pattern to form
  the low luminous intensity region/the high luminous
  intensity region.

15. The vehicle head lamp according to claim 1, wherein
the spatial light modulator is a transmissive liquid crystal
  device including the light source as a front light and a
  second liquid crystal layer,
the second liquid crystal layer is a reflective liquid crystal
  device gradationally switchable for each unit element
  between a first state in which light incident from the
  front light is reflected and a second state in which a
  change in the light incident from the front light is not
  reflected depending on a magnitude of an applied
  voltage given, and
the control device controls the voltage applied to the
  second crystal layer for each unit element and controls
  reflectance of the second liquid crystal layer for each
  unit element to form a desired light distribution pattern
  from light emitted from the front light and reflected by
  the second liquid crystal layer.

16. The vehicle head lamp according to claim 15, wherein
the control device controls an applied voltage in a predetermined part of the second liquid crystal layer
  corresponding to a predetermined region in a desired
  light distribution pattern to be lower/higher than a
  voltage applied to a part of the second liquid crystal
  layer corresponding to the outside of the predetermined
  region in the desired light distribution pattern and
  increases/decreases reflectance of light incident from
  the front light to form the low luminous intensity
  region/the high luminous intensity region.

17. The vehicle head lamp according to claim 1, wherein
the spatial light modulator is a light deflection mechanism
  having a light deflection device whose surface is provided with a plurality of reflective elements capable of
  selectively reflecting light incident individually by
  pivot,
the light deflection mechanism is disposed so as to be
  capable of selectively reflecting the light emitted from
  the light source toward a front of the vehicle by the
  reflective element, and
the control device individually controls a timing of turning on and off the light source and pivot of the reflective
  element to form a desired light distribution pattern by
  the reflected light from the reflective element.

18. The vehicle head lamp according to claim 1, wherein
the low luminous intensity region surrounds the high luminous intensity region.

19. The method according to claim 1, wherein the low
luminous intensity region surrounds the high luminous
intensity region.

20. A method of controlling a vehicle head lamp comprising:
forming a desired light distribution pattern by radiating
  light emitted from the light source forward via a spatial
  light modulator having a light source, wherein a high
  luminous intensity region and a low luminous intensity
  region that is adjacent to an outer edge of the high
  luminous intensity region and has a luminous intensity
  lower than a luminous intensity of the high luminous
  intensity region are formed in the desired light distribution pattern to be irradiated by controlling the spatial
  light modulator by the control device, and the low
  luminous intensity region is configured such that the
  luminous intensity decreases gradationally from the
  outer edge of the high luminous intensity region toward
  an outside of the low luminous intensity region, and controlling the spatial light modulator so as to relatively change at least one of sizes, luminous intensities, and positions of the high luminous intensity region and the low luminous intensity region in accordance with a traveling condition of a vehicle on which the control device is equipped; the traveling condition of a vehicle comprising detection of speed of the vehicle exceeding a predetermined value or detection of a steering motion.

\* \* \* \* \*